United States Patent
Saito

(10) Patent No.: US 7,895,655 B2
(45) Date of Patent: Feb. 22, 2011

(54) MALICIOUS-PROCESS-DETERMINING METHOD, DATA PROCESSING APPARATUS AND RECORDING MEDIUM

(75) Inventor: Kazunori Saito, Osaka (JP)

(73) Assignee: Secure Ware Inc., Osaka (JP)

( * ) Notice: Subject to any disclaimer, the term of this patent is extended or adjusted under 35 U.S.C. 154(b) by 1472 days.

(21) Appl. No.: 11/211,556

(22) Filed: Aug. 26, 2005

(65) Prior Publication Data

US 2006/0026685 A1 Feb. 2, 2006

Related U.S. Application Data

(63) Continuation of application No. PCT/JP2004/002319, filed on Feb. 26, 2004.

(30) Foreign Application Priority Data

Feb. 26, 2003 (JP) ............................. 2003-049911

(51) Int. Cl.
*G06F 12/14* (2006.01)
*G06F 12/16* (2006.01)
*G08B 9/00* (2006.01)

(52) U.S. Cl. .............................. 726/24; 726/21; 726/22; 726/23; 726/26; 726/30

(58) Field of Classification Search ........................ None
See application file for complete search history.

(56) References Cited

U.S. PATENT DOCUMENTS 5,414,833 A * 5/1995 Hershey et al. ............... 726/22

| | | | | |
|---|---|---|---|---|
| 5,826,013 A * | 10/1998 | Nachenberg | ................. | 726/22 |
| 6,058,372 A * | 5/2000 | Sweet et al. | ................. | 705/16 |
| 6,073,239 A * | 6/2000 | Dotan | ................. | 726/24 |
| 6,301,699 B1 * | 10/2001 | Hollander et al. | ................. | 717/131 |
| 6,405,303 B1 * | 6/2002 | Miller et al. | ................. | 712/210 |
| 6,832,302 B1 * | 12/2004 | Fetzer et al. | ................. | 711/170 |
| 7,360,076 B2 * | 4/2008 | Anand et al. | ................. | 713/151 |

FOREIGN PATENT DOCUMENTS

| JP | 1-237834 A | 9/1989 |
|---|---|---|
| JP | 9-319574 A | 12/1997 |
| JP | 11-167487 A | 6/1999 |
| JP | 2001-508564 A | 6/2001 |
| JP | 2001-344128 A | 12/2001 |

OTHER PUBLICATIONS

Endo et al., "Computer Virus to Vaccine tono Tatakai", Journal of Information Processing society of Japan, vol. 39, No. 12, Dec. 15, 1998, pp. 1215-1219.

(Continued)

*Primary Examiner*—Kaveh Abrishamkar
(74) *Attorney, Agent, or Firm*—Birch, Stewart, Kolasch and Birch, LLP

(57) ABSTRACT

A malicious process method, a data processing apparatus and a recording medium according to the present invention reads data stored in a buffer memory in terms of bytes and sequentially analyzes what kind of instruction code is included in a plurality of instruction sequence having different read positions. It is determined that a malicious code is included in an instruction sequence when an int instruction is included in an analyzed instruction sequence, an instruction code has a particular emergence pattern and a character code corresponding to "/" is included in stored command data.

15 Claims, 21 Drawing Sheets

OTHER PUBLICATIONS

"Symantec Anti-Virus Research Center, SARC, no Shotai", ASCII Network Technology, vol. 3, No. 12, Dec. 1, 1998, pp. 216-219.

Hukuda, "Tsugino Itteha Korede Kimari ! Network Security Keiko to Taisaku", Software Design, No. 143, Sep. 18, 2002, pp. 29-37.

Andoh, "Virus Taisaku Saizensen", Nikkei Internet Solutions, No. 65, Nov. 22, 2002, pp. 68-81.

Eitaro Saito, 2001 Nen Han "Virus Daizukan" Nikkei Network, No. 16, Jul. 22, 2001, pp. 59-85.

* cited by examiner

FIG. 2
(1) RECEPTION OF DATA
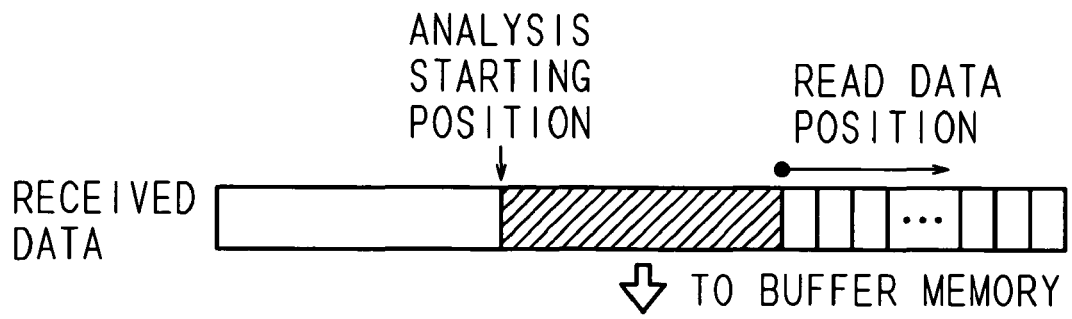
(2) EXTRACTION OF DATA TO BE ANALYZED
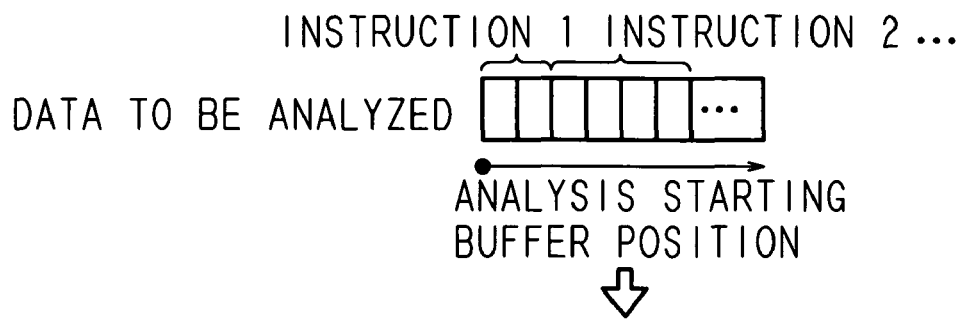
(3) ANALYSIS OF A PLURALITY OF INSTRUCTION SERIES
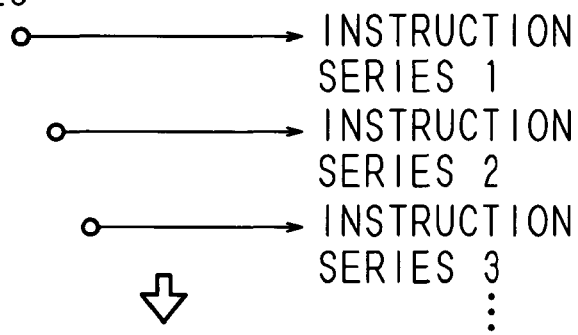
(4) DETECTION OF MALICIOUS CODE
DETECT INSTRUCTION SERIES HAVING PARTICULAR STRUCTURE
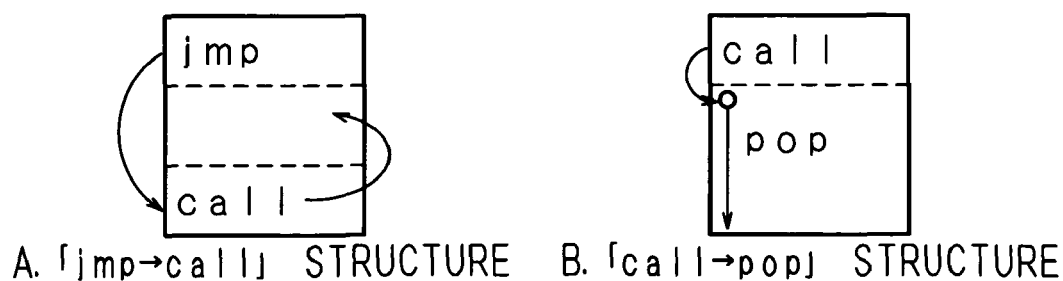
A. 「jmp→call」 STRUCTURE    B. 「call→pop」 STRUCTURE FIG. 7
A. 「jmp→call」 STRUCTURE
(a)
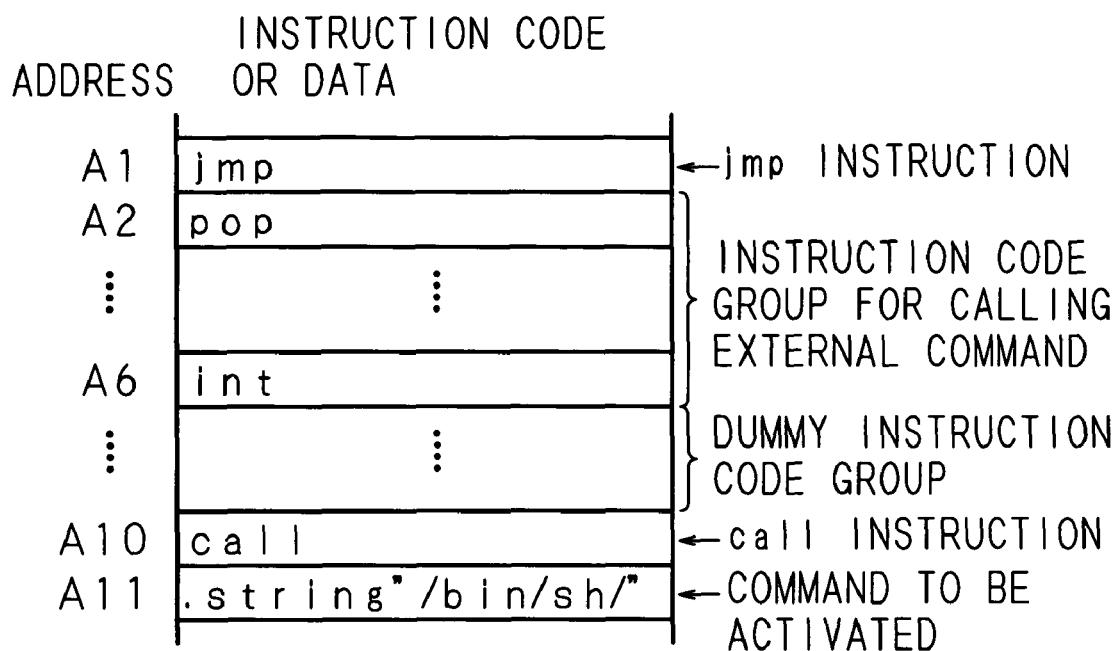
(b)
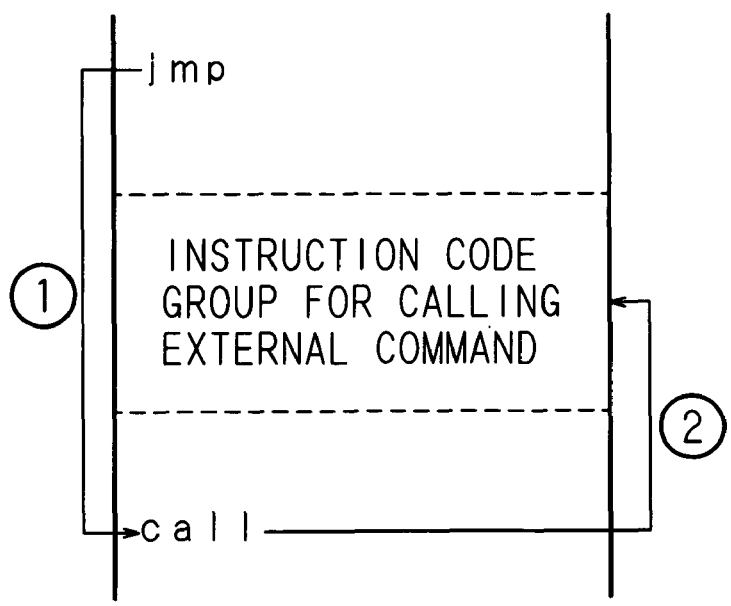

FIG. 8
B. 「call→pop」 STRUCTURE
(a)
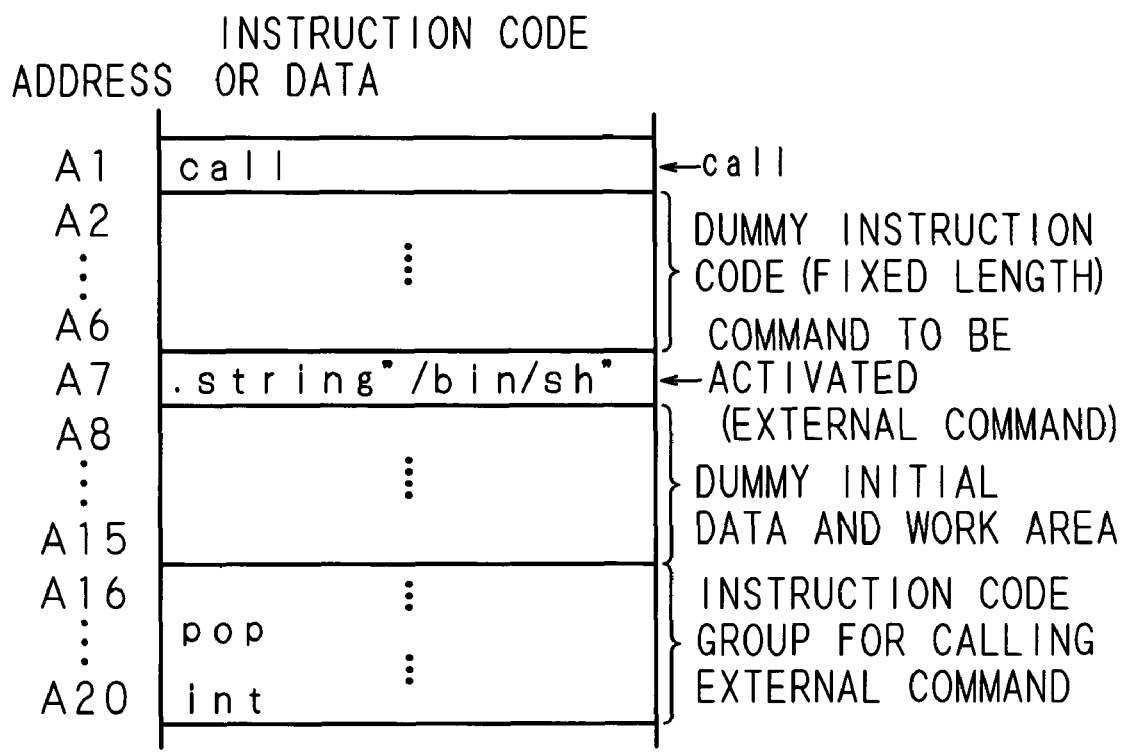
(b)
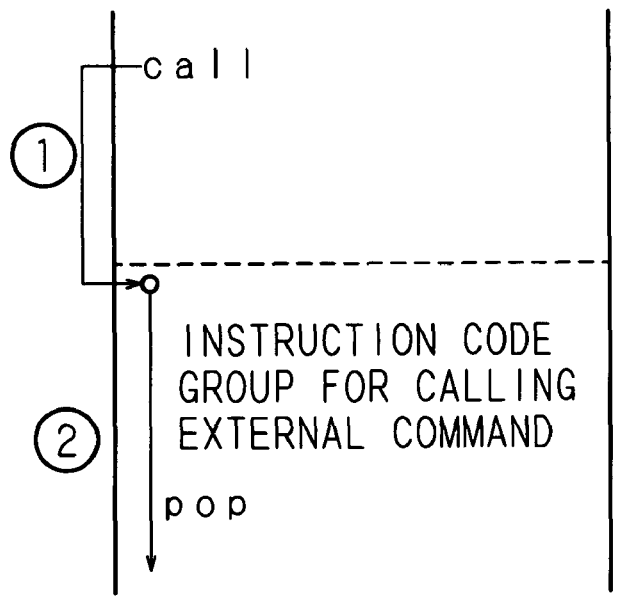

MALICIOUS-PROCESS-DETERMINING METHOD, DATA PROCESSING APPARATUS AND RECORDING MEDIUM

CROSS-REFERENCE TO RELATED APPLICATIONS

This application is a Continuation of copending PCT International Application No. PCT/JP2004/002319 filed on Feb. 26, 2004, which designated the United States, and on which priority is claimed under 35 U.S.C. §120. This application also claims priority under 35 U.S.C. §119(a) on Patent Application No(s). 2003-049911 filed in Japan on Feb. 26, 2003. The entire contents of each of the above documents is hereby incorporated by reference.

TECHNICAL FIELD

The present invention relates to: a malicious-process-determining method for detecting data which executes a malicious process; a data processing apparatus; and a computer-readable recording medium recorded a computer program for realizing the data processing apparatus.

BACKGROUND TECHNIQUE

Along with the popularization of the Internet network, various kinds of information processing apparatuses have become target of an attack such as computer virus and cracking and tend more to be exposed to such a menace. In cases of recent years, for example, computer virus typified by "Nimda" and "Code Red", which self-propagates using vulnerability (security hole) of an application program such as a system program or a web browser, has caused serious damage.

In an attack mentioned above by computer virus, cracking and the like, attack data including an instruction code for performing a malicious process (hereinafter referred to as a malicious code) is transmitted to an information processing apparatus such as a server apparatus and a personal computer which is the target of the attack, so that the instruction code is executed at the information processing apparatus. There are a variety of such attack techniques and an attack technique by buffer overflow is known as one thereof. In buffer overflow, when a buffer secured in a stack falls into a buffer overflow state where writing is performed at a stack area larger than the secured buffer, unexpected variable destruction is caused which may lead to malfunction of a program. In an attack by buffer overflow, malfunction of a program is caused intentionally so as to obtain administrator authorization of a system, for example.

In order to cope with these attacks such as computer virus and cracking, as described in Japanese Patent Application Laid-Open No. H9-319574, for example, a process of detecting presence of a particular bit pattern to be found in a malicious code is performed for received data. When such a bit pattern is included in received data, it is determined that the data is attack data including a malicious code, and rejection of data, annunciation to the user and the like are performed.

Accordingly, in order to cope with a variety of attacks such as computer virus and cracking with a conventional technique, it is necessary to prepare and store a particular bit pattern corresponding to each computer virus and cracking in a database, and the database must be updated to cope with a case where new computer virus or cracking technique is found.

In a conventional detecting method for attack data, a known bit pattern is detected as described above, or the structure of a portion which is not essential for an attack process such as simple repetition of a NOP (non-operation) instruction is detected. Accordingly, the method is vulnerable to variation of attack data and it is necessary to update a database of bit patterns used for detection every time unknown attack data arises, arousing concern over time lag before the database is updated.

The present invention has been made in view of this, and it is an object thereof to provide: a malicious-process-determining method which is constructed to detect a pattern of occurrence of instruction codes that occur in each of data sequences that are respectively composed of a sequence of byte strings each having a first byte corresponding to a different read address and determine whether a process by each of data sequence is a malicious process or not based on the detection result, so as to detect even an unknown instruction code group, which performs a malicious process, without the need to prepare a bit pattern or the like for detecting an instruction code group which performs a malicious process; a data processing apparatus; and a computer-readable record medium recorded a computer program for realizing the data processing apparatus.

DISCLOSURE OF THE INVENTION

A malicious-process-determining method according to the first invention is a malicious-process-determining method for determining whether or not a malicious process is executed based on instruction codes included in received data, using a data processing apparatus comprising receiving means for receiving data including a plurality of instruction codes having different byte lengths and storing means for storing received data, characterized by comprising the steps of reading data stored in the storing means sequentially by one byte; detecting a pattern of occurrence of instruction codes that are contained in each of data sequences, which are respectively composed of a contiguous sequence of byte strings and have a first byte corresponding to a different read address; and determining whether a process, which is executed in each of data sequences, is a malicious process or not based on the detected pattern of occurrence of instruction codes.

A data processing apparatus according to the second invention is a data processing apparatus comprising receiving means for receiving data including a plurality of instruction codes having different byte lengths, storing means for storing received data and determining means for determining whether or not a process to be executed is a malicious process based on the instruction codes included in stored data, characterized by comprising: means for reading data stored in the storing means sequentially by one byte; and detection means for detecting a pattern of occurrence of instruction codes that are contained in each of data sequences, which are respectively composed of a contiguous sequence of byte strings and have a first byte corresponding to a different read address; wherein determining means determines whether a process, which is executed in each of data sequences, is a malicious process or not based on the detected pattern of occurrence of instruction codes.

The data processing apparatus according to the third invention is the data processing apparatus according to the second invention, characterized by further comprising a table storing the relationship between data of the first byte of the instruction code and the byte length of the instruction code.

The data processing apparatus according to the fourth invention is the data processing apparatus according to the second invention, characterized in that a data sequence including a pattern to be detected by the detection means includes a process for obtaining an address of the storing means where a executing instruction code group is located.

The data processing apparatus according to the fifth invention is the data processing apparatus according to the second or fourth invention, characterized in that one of the pattern to be detected by the detection means includes an instruction code for calling an instruction code group for executing a predetermined process, and the instruction code group includes an instruction code for obtaining a return address.

The data processing apparatus according to the sixth invention is the data processing apparatus according to the fifth invention, characterized in that the pattern includes an instruction code that is related to a branch instruction, and an branch address of the instruction code is associated with an instruction code for calling the instruction code group.

A data processing apparatus according to the seventh invention is the data processing apparatus according to the fifth invention, characterized in that the pattern further includes an instruction code for activating system call.

The data processing apparatus according to the eighth invention is the data processing apparatus according to the fifth invention, characterized in that the pattern further includes an instruction code for indicating rewriting of data starting from the address.

The data processing apparatus according to the ninth invention is the data processing apparatus according to the fifth invention, characterized in that the pattern further includes a predetermined character code after the instruction code.

The data processing apparatus according to the tenth invention is the data processing apparatus according to the second invention, characterized in that determination means determines that the detected data sequence is data for executing a malicious process when detection means detects one of the pattern to be detected.

The data processing apparatus according to the eleventh invention is the data processing apparatus according to the second invention, characterized by further comprising means for notifying information to the outside when the determining means determines that the detected data sequence is data for executing a malicious process.

A data processing apparatus according to the twelfth invention is a data processing apparatus comprising: receiving section for receiving data including a plurality of instruction codes having different byte lengths; a memory for storing received data; and a controller capable of performing operations of: reading data stored in the memory sequentially by one byte; detecting a pattern of occurrence of instruction codes that are contained in each of data sequences, which are respectively composed of a contiguous sequence of byte strings and have a first byte corresponding to a different read address; and determining whether a process, which is executed in each of data sequences, is a malicious process or not based on the detected pattern of occurrence of instruction codes.

The data processing apparatus according to the thirteenth invention is the data processing apparatus according to the twelfth invention, characterized in that a data sequence including an pattern to be detected by the detection means includes a process for obtaining an address of the storing means where a executing instruction code group is located.

The data processing apparatus according to the fourteenth invention is the data processing apparatus according to the twelfth invention, characterized in that one of the pattern to be detected by the detection means includes an instruction code for calling an instruction code group for executing a predetermined process, and the instruction code group includes an instruction code for obtaining a return address.

A computer-readable record medium according to the fifteenth invention is a computer-readable recording medium recorded a computer program comprising a step of causing a computer to determine whether or not a malicious process is executed based on data including a plurality of instruction codes having different byte lengths, wherein the recorded computer program comprising the steps of causing the computer to detect a pattern of occurrence of instruction codes that are contained in each of data sequences, which are respectively composed of a contiguous sequence of byte strings and have a first byte corresponding to a different read address; and causing the computer to determine whether a process, which is executed in each of data sequences, is a malicious process or not based on the detected pattern of occurrence of instruction codes.

With the present invention, for reading data from storing means sequentially by one byte and determining whether an instruction code for executing a malicious process is included or not, a pattern of occurrence of instruction codes is detected for a plurality of data sequence having different read positions. Accordingly, by focusing attention on a pattern of occurrence of instruction codes which are uncommon in normal data for detection, it becomes possible to cope with occurrence of an unknown malicious code as long as the essential process content of the malicious code does not change. Moreover, although a pattern to be detected sometimes differs according to where is set as a detection starting position since detection in the present invention is performed based on a pattern of occurrence of instruction codes, improper determination tends less to be made and the detection accuracy is enhanced by performing detection for a plurality of data sequences having sequentially different read addresses.

With the present invention comprising a table for storing a correspondence of data of a first byte of an instruction code to a byte length of the instruction code, it is possible to inhibit detection of a malicious code when a read address of data is located at a byte other than the first byte of an instruction code in an instruction sequence and enhancement of the processing speed can be realized.

With the present invention, since a pattern including a process of obtaining an address in storing means where a running instruction code group is located is detected, a detection technique which focuses attention on the essential structure of a malicious code can be suggested.

With the present invention, a pattern which includes an instruction code for calling an instruction code group for executing a predetermined process and includes an instruction code for obtaining a return address of the instruction code in an instruction code group of a calling destination is detected. Accordingly, it is possible to easily determine whether data is one for executing a malicious process or not, and it becomes possible to cope with an unknown malicious code by performing detection on the basis of the essential structure thereof.

With the present invention, a pattern having a branch destination of a branch instruction associated with the instruction code group mentioned above is detected. Accordingly, it is possible to easily determine whether data is one for executing a malicious process or not, and it becomes possible to cope with an unknown malicious code by performing detection based on the essential structure thereof.

With the present invention, a pattern further including an instruction code for activating system call is detected.

Accordingly, it is possible to detect a case where the probability of execution of a malicious code is increased, and therefore the detection accuracy is enhanced.

With the present invention, a pattern including an instruction code for indicating rewriting of data starting from the return address is detected. Accordingly, it becomes possible to cope with even a malicious code from which it is unclear before execution that what type of process is to be executed.

With the present invention, since it is determined whether a predetermined character code is included after an instruction code for calling the instruction code mentioned above or not, the detection accuracy in the detection process of a malicious code for a particular CPU is enhanced.

With the present invention, it is possible to easily determine whether data is one for executing a malicious process or not since it is determined that data is one for executing a malicious process when an occurrence pattern of instruction codes to be detected is detected, and it becomes possible to cope with even an unknown malicious code since determination is made on the basis of the essential structure thereof.

With the present invention, when it is determined that a detected data series is data for executing a malicious process, the fact is announced to outside. Accordingly, it becomes possible to break communication or the like at the point of detection of a malicious code to prevent failure to be caused by the malicious code.

BRIEF DESCRIPTION OF THE DRAWING

FIG. 2 is a schematic view for explaining a process to be executed by the data processing apparatus;

FIG. 7 is a schematic view for explaining an emergence pattern of an instruction code to be detected by an analysis process of the data processing apparatus;

FIG. 8 is a schematic view for explaining an emergence pattern of an instruction code to be detected by an analysis process of the data processing apparatus;

BEST EMBODIMENT FOR IMPLEMENTING THE INVENTION

The following description will explain the present invention in the concrete with reference to the drawings illustrating some embodiments thereof.

First Embodiment

Figure 1:
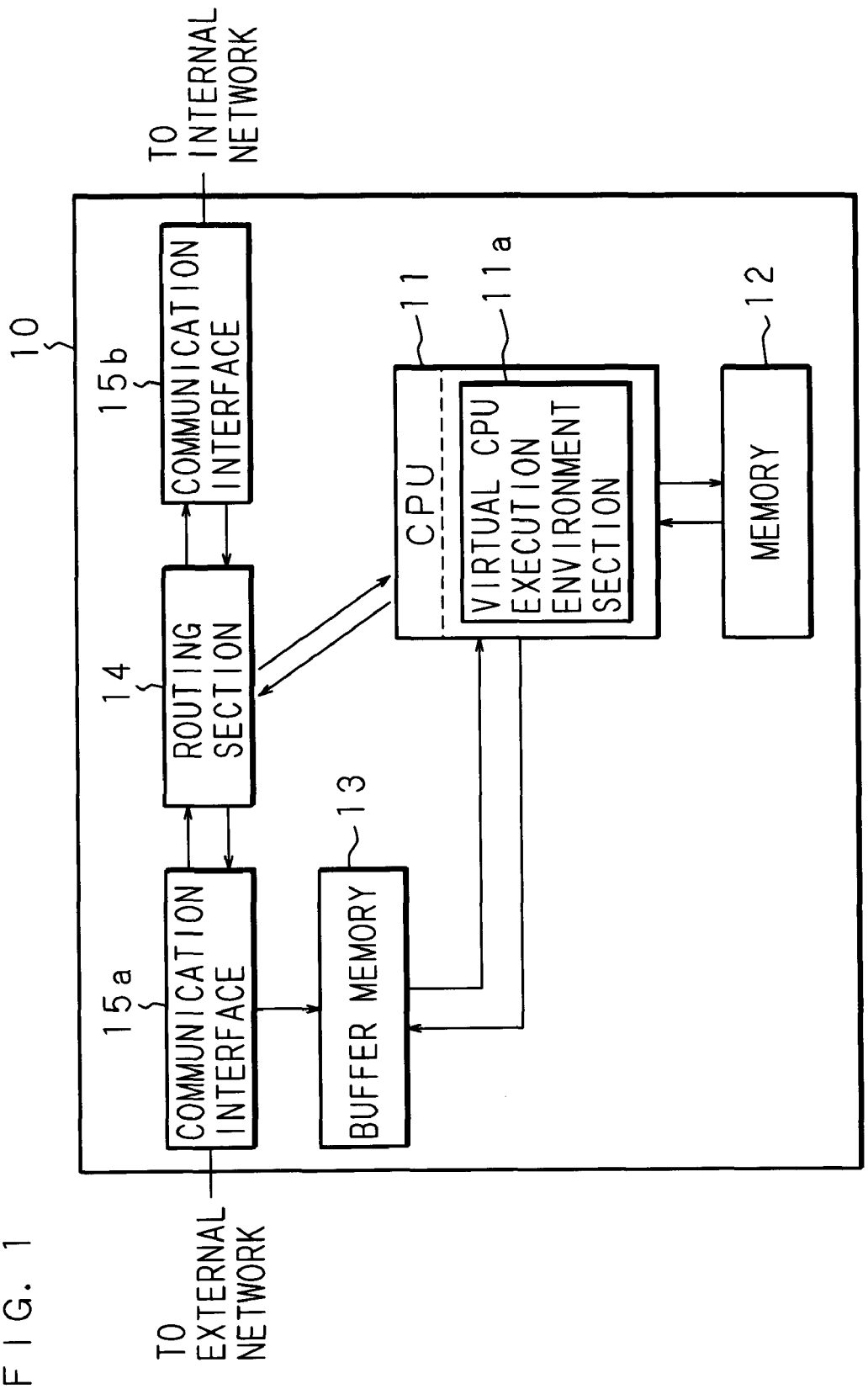
FIG. 1 is a block diagram of a data processing apparatus according to the present embodiment.

FIG. 1 is a block diagram of a data processing apparatus according to the present embodiment. Denoted at 10 in the figure is a data processing apparatus, which comprises a CPU 11, a communication interface 15a to be connected with an external network and a communication interface 15b to be connected with an internal network. The data processing apparatus 10 is an apparatus, such as a router, a broadband router or a switch, for relaying data which is transmitted and received on a communication network. The communication interface 15a is connected with an information processing apparatus, a communication device and the like, which are communication targets, via the external network and the communication interface 15b is connected with an information processing apparatus, a communication device and the like, which are used by users, via the internal network. The information processing apparatus includes a personal computer, a workstation, a server apparatus, a PDA (Personal Digital Assistant) and the like, and the communication device includes a mobile telephone and the like.

The CPU 11 is connected with hardware such as a memory 12, a buffer memory 13 and a routing section 14 and controls each hardware mentioned above by reading and executing a control program which is prestored in the memory 12 so as to cause the apparatus to operate as an apparatus for relaying various kinds of data which is transmitted and received between the external network and the internal network. The memory 12 stores, in addition to the control program for operating each hardware, a routing table for storing a destination network address for deciding a communication path and a computer program of the present invention.

When the communication interface 15b of the data processing apparatus 10 receives data which is transmitted from the internal network side to the external network side, the CPU 11 refers to the routing table stored in the memory 12 to decide the communication path and controls the routing section 14 according to the decided communication path. The CPU 11 then transmits data to an information processing apparatus or a communication device, which is the destination, via the communication interface 15a.

Moreover, data which is transmitted from the external network side to the internal network side is relayed by the data processing apparatus 10 according to the procedure similar to the one described above. Here, the data processing apparatus 10 stores data from the external network side received at the communication interface 15*a* temporarily in the buffer memory 13 and analyzes the stored data, so as to determine whether or not the data includes an instruction code (hereinafter referred to as a malicious code) for causing a particular CPU (hereinafter referred to as a CPU to be protected) to execute a malicious process. In analysis and determination of data stored in the buffer memory 13, the CPU 11 reads a computer program of the present invention from the memory 12 and executes the program, and creates a virtual CPU execution environment unit 11*a* for giving an environment for analysis and determination of data inside thereof. The virtual CPU execution environment unit 11*a* that comprises a virtual register and a virtual stack and the like, which are corresponding to a register and a stack to be used by a CPU to be protected, interprets data to be analyzed as an instruction code of the CPU to be protected, virtually decodes the data and stores a parameter and the like generated at the time. The CPU 11 then determines presence of a malicious code by monitoring the state or the like of the virtual register and the virtual stack provided at the virtual CPU execution environment unit 11*a*.

It should be noted that, although the CPU 11, the memory 12 and the buffer memory 13 are respectively provided separately in the present embodiment, an ASIC (Application Specified IC) or the like having a buffer memory and an IC (Integrated Circuit) storing a computer program of the present invention mounted on one chip may be provided.

FIG. 2 is a schematic view for explaining a process to be executed by the data processing apparatus 10. The process to be executed by the data processing apparatus 10 is divided broadly into (1) the reception of data from the external network, (2) the extraction of data to be analyzed, (3) the analysis of a plurality of instruction series derived from data to be analyzed and (4) the detection of a malicious code in each instruction series. The following description will explain each process.

(1) Reception of Data

The communication interface 15*a* of the data processing apparatus 10 receives data in a predetermined unit (in packet, for example) according to the communication procedure compatible with the communication standard of the connected external network. Each unit of received data has a predetermined byte length and is composed of a communication header including address information of a source and a destination and user data which is arbitrarily created by the user. The user data includes an instruction code for executing a process required by the user and a malicious process may possibly be executed by this instruction code.

(2) Extraction of Data to be Analyzed

Therefore, the data processing apparatus 10 sequentially extracts received data by one byte, stores the data in the buffer memory 13 and makes an analysis. A position where extraction of data is started, i.e. an analysis starting position, can be an arbitrary preset position. For example, a first byte of received data may be the analysis starting position, or a first byte of user data excluding a communication header may be the analysis starting position. Moreover, the buffer size of the buffer memory 13 for storing data extracted as one to be analyzed is preset so that at least one instruction code having the largest instruction length among instruction codes which can be decoded by the CPU to be protected is stored.

(3) Analysis of a Plurality of Instruction Series

Next, data to be analyzed stored in the buffer memory 13 is analyzed while deriving a plurality of instruction series. Here, an instruction sequence means a series of instruction codes of a CPU to be protected starting from a position designated for data to be analyzed.

For analyzing data to be analyzed, the CPU 11 reads data sequentially by one byte starting from the first byte of the buffer memory 13. The CPU 11 interprets to a first byte of what type of instruction code the read one byte data corresponds in the CPU to be protected and stores the type of the instruction, the starting position of the next instruction and the parameter to be used by the instruction based on the interpretation result. In practice, a table (hereinafter referred to as an instruction table) defining a correspondence of a character code of a first byte of an instruction code to be used in the CPU to be protected in a computer program of the present invention to the instruction length of the instruction code, the parameter to be used and the like is provided and the instruction table is stored in the memory 12 when the CPU 11 loads the computer program of the present invention. The CPU 11 refers to the instruction table to interpret the one byte data read from the buffer memory 13.

After finishing interpretation of read one byte data, the CPU 11 further reads one byte of data while shifting the analysis starting buffer position corresponding to the read position from the buffer memory 13 by one byte and analyzes an instruction series having the read position of the read data as the first byte. By executing such a process repeatedly by shifting the analysis starting buffer position sequentially, a plurality of instruction series having different read positions are analyzed.

Moreover, on the analysis starting buffer position of the buffer memory 13 which has finished an analysis, data of the next read data position is stored from received data.

(4) Detection of Malicious Code

Next, the CPU 11 of the data processing apparatus 10, which is constructed to detect an instruction sequence having a particular structure (occurrence pattern) based on the state or the like of the virtual register and the virtual stack provided at the virtual CPU execution environment unit 11*a*, determines that a malicious code has been detected when an instruction series having a particular structure is detected. In the present embodiment, data having the following two types of structures is detected.

One is a structure in which a branch destination of a branch instruction (hereinafter referred to as a jmp instruction) is associated with an address of an instruction code (hereinafter referred to as a call instruction) for calling an instruction code group and a calling destination of the call instruction corresponds to an address between the jmp instruction and the call instruction. This structure will be hereinafter referred to as a "jmp→call" structure. To be usually found in a malicious code of an attacker is this structure which is combined with a "call→pop" structure that will be described below.

With a malicious code having this structure, information of an address (return address) just after a call instruction in an instruction code group between a jmp instruction and a call instruction is obtained, the address is used as a clue for obtaining an external command embedded in a malicious code itself, and the external command is executed or the malicious code itself is rewritten.

The other is a structure provided with a pop instruction having no preceding push instruction at a calling destination of a call instruction. Here, a push instruction is an instruction for storing an address value or the like temporarily in a stack area and a pop instruction is an instruction for obtaining an address value or the like stored in the stack area reversely. This structure will be hereinafter referred to as a "call→pop" structure.

With a malicious code having this structure, an external command is also executed or a malicious code itself is also rewritten using a technique similar to the "jmp→call" structure described above. That is, when the call instruction is executed, information of a return address stored in the stack area is obtained with the pop instruction and the address is used as a clue for executing the external command or rewriting the malicious code itself.

Since the two types of instruction structures described above are uncommon in general data, the probability of inclusion of a malicious code is high when the data processing apparatus 10 detects an emergence pattern of an instruction having these structures.

It should be noted that an operation of a malicious code using the "jmp→call" structure and the "call→pop" structure will be described below in detail.

Figure 3:
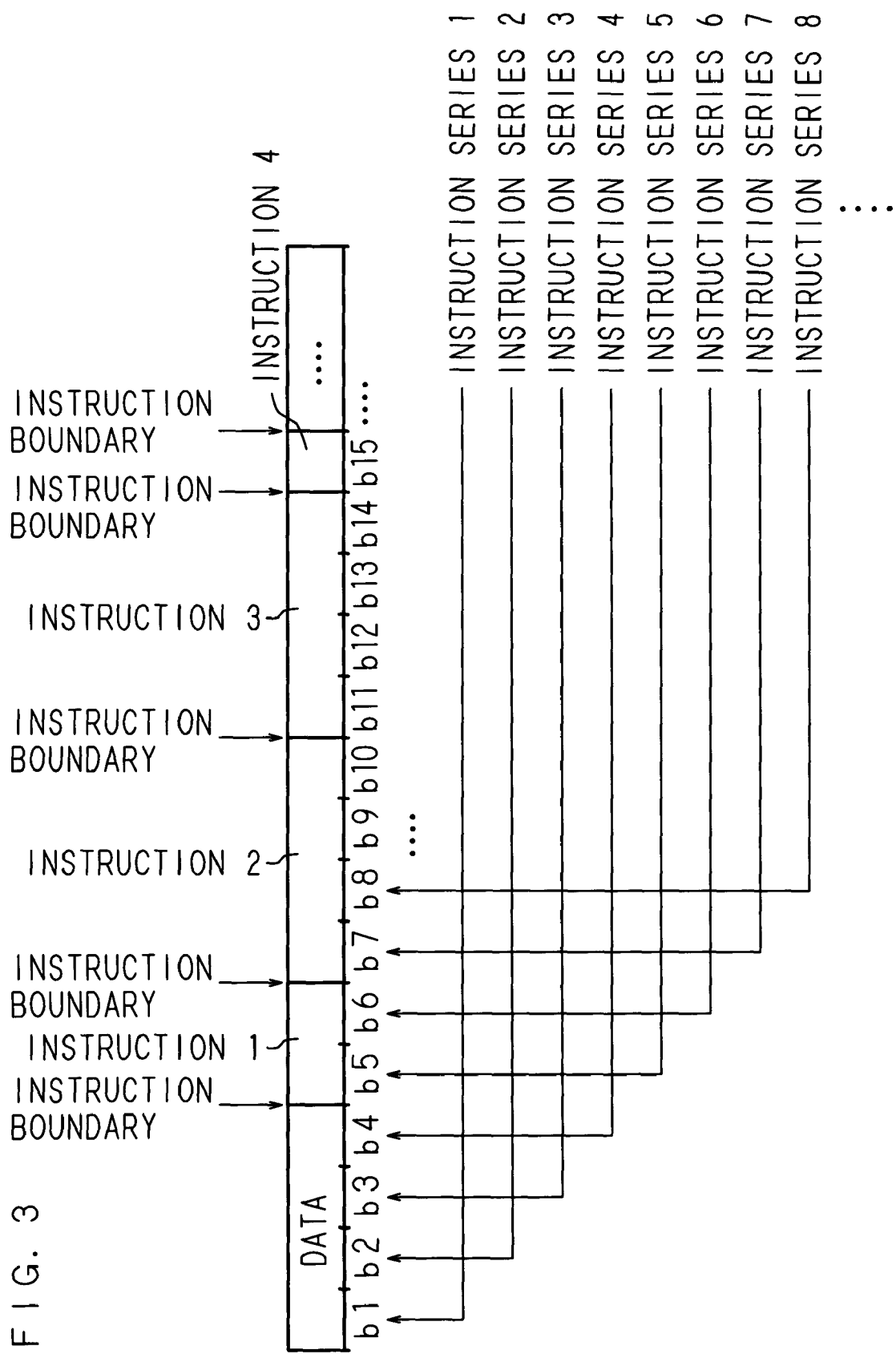
FIG. 3 is a schematic view for explaining the structure of data to be analyzed.

FIG. 3 is a schematic view for explaining the structure of data to be analyzed. The instruction length of an instruction code to be used in the CPU to be protected is not always constant and an instruction code having a variety of instruction length is sometimes used. Moreover, data to be received sometimes includes mere data, such as image data or document data, which is not an instruction code. Accordingly, when a read position of data to be analyzed is set inappropriately, an instruction code may possibly be interpreted improperly, causing determination mistake of presence of a malicious code.

Therefore, in the present embodiment, in order to properly grasp a boundary between mere data and an instruction code and a boundary (instruction boundary) between two instruction codes, data to be analyzed stored in the buffer memory 13 is read by one byte and analysis of data goes on considering read data as a first byte of an instruction code. By referring to the instruction table described above, the position of the next instruction code can be determined from read one byte data and therefore it becomes possible to sequentially grasp an instruction code and it is possible to interpret data to be detected as one series (instruction series) of a series of a plurality of instruction codes. Moreover, since interpretation is performed while shifting the read position of data by one byte, it is possible to sequentially derive a plurality of instruction series having different first byte position and it becomes possible to analyze an instruction series having a proper instruction boundary to be included in the instruction series.

The following description is concrete explanation using FIG. 3. Data to be analyzed shown in FIG. 3 is data including a series of mere data of four bytes starting from the first byte; an instruction code of two bytes (instruction 1); an instruction of four bytes (instruction 2); an instruction code of four bytes (instruction 3); an instruction code of one byte (instruction 4); . . . . First, the analysis starting buffer position is set to b1, one byte data is read, information of the instruction content, the position of the next instruction code, the parameter to be used for the instruction code and the like is obtained and analysis for an instruction series 1 having b1 as the first byte is started. Then, the analysis starting buffer position is sequentially shifted to b2, b3, b4, . . . to analyze in parallel an instruction series 2, an instruction series 3, an instruction series 4, . . . having each read position as the first byte. In the example shown in FIG. 3, an instruction series 5 having the position of b5 as the first byte is a series of a proper instruction code and it is determined that a malicious code has been detected when the "jmp→call" structure or the "call→pop" structure is detected in the analysis of the instruction series 5.

It should be noted that analysis of data can be omitted since a data series 7 starting from b7, a data series 11 starting from b11, a data series 15 starting from b15 and the like are included as a part of the data series 5.

Figure 4:
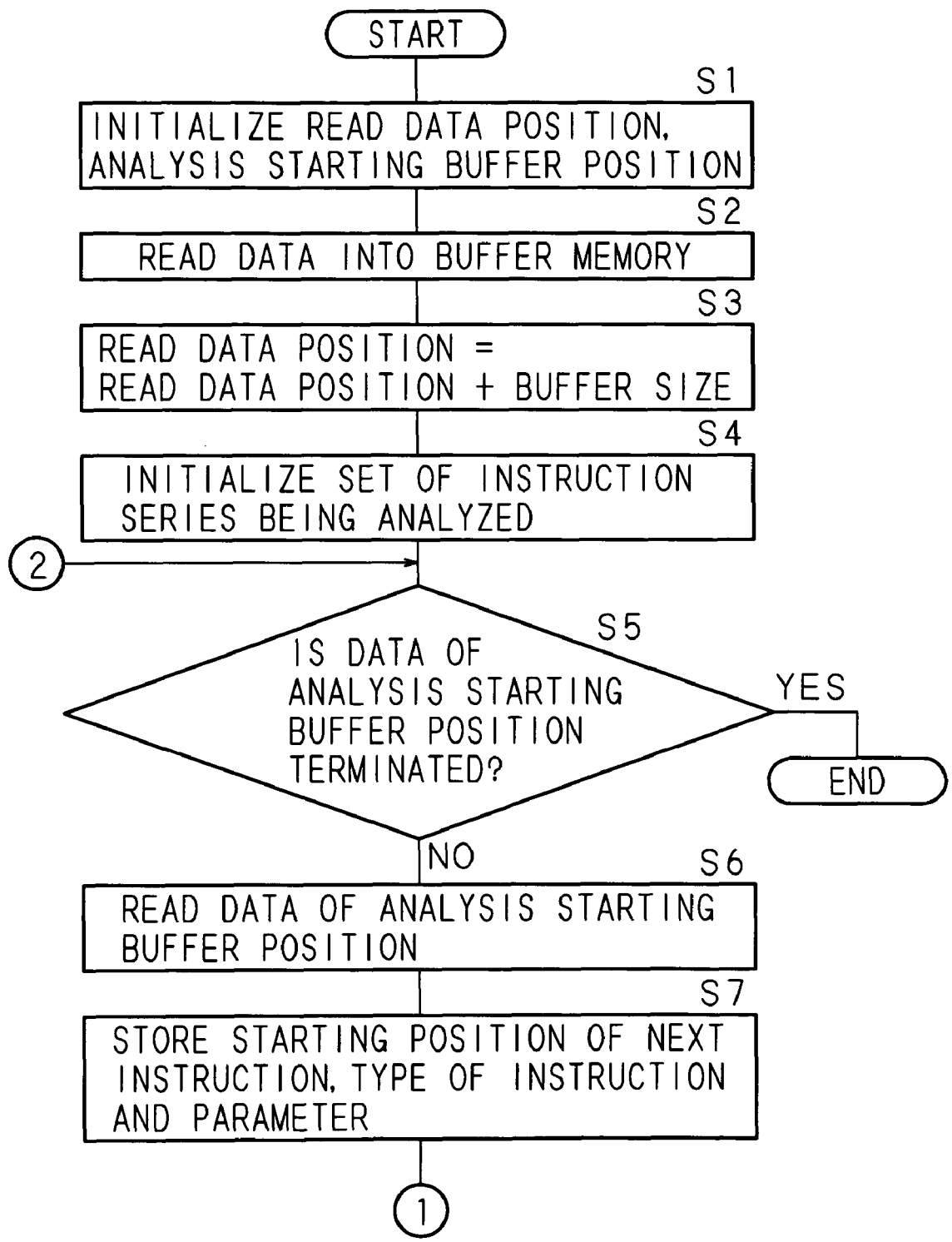
FIG. 4 is a flowchart for explaining the detection procedure of a malicious code by the data processing apparatus.
Figure 5:
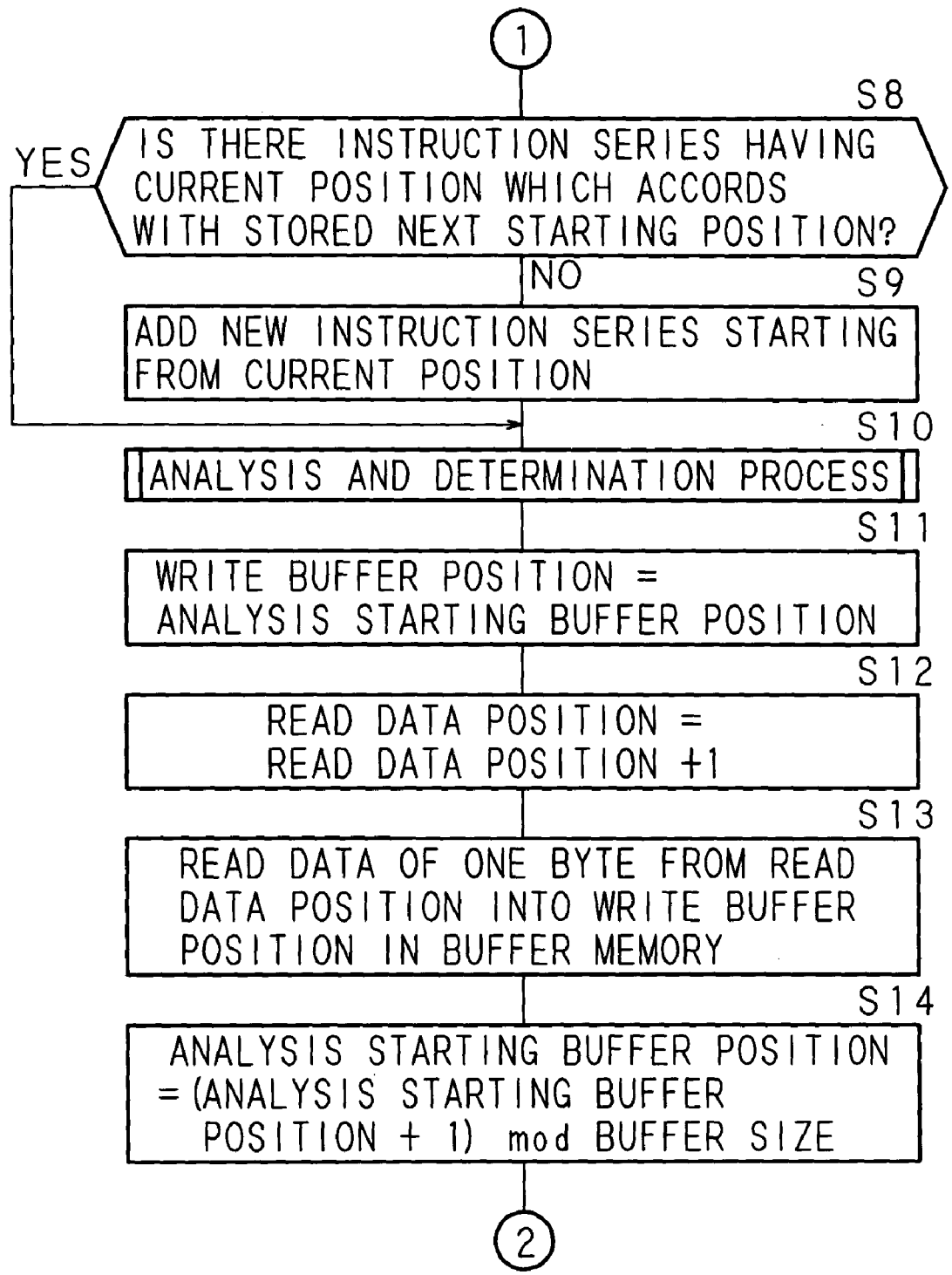
FIG. 5 is a flowchart for explaining the detection procedure of a malicious code by the data processing apparatus.

The following description will explain the detection procedure of a malicious code by the data processing apparatus 10. FIGS. 4 and 5 are a flowchart for explaining the detection procedure of a malicious code by the data processing apparatus 10. When data from the external network is received at the communication interface 15a, first of all, a read data position and an analysis starting position are initialized (step S1) and data is read into the buffer memory 13 (step S2). In this reading of initial stage, data is read only by the buffer size of the buffer memory 13. A position obtained by adding the buffer size to the read data position is then set as the next read data position (step S3). Moreover, when there is an instruction series in the course of analysis, a set of the instruction series is initialized (step S4).

It is then judged whether data of the analysis starting buffer position is termination of received data or not (step S5). A detection process of a malicious code of this flowchart is terminated when the data of the analysis starting buffer position is terminated (S5: YES), while data of one byte of the analysis starting buffer position is read (step S6) when the data of the analysis starting buffer position is not terminated (S5: NO). Then, the next instruction starting position, the type of the instruction and the parameter are obtained on the basis of the read one byte data and stored in the memory 12 (step S7).

The CPU 11 then judges whether or not there is an instruction series a current position of which accords with the stored next starting position in an instruction series in the course of analysis (step S8). When there is an instruction series a current position of which accords with the stored next starting position (S8: YES), an analysis and determination process which will be described below is executed for all instruction series (step S10).

When there is no instruction series a current position of which accords with the stored next starting position (S8: NO), an instruction series starting from the current position is added as a new instruction series to be a target of the analysis and determination process (step S9) and the analysis and determination process is executed (S10).

The write buffer position is then set as the analysis starting buffer position (step S11) and read data position is increased by one (step S12). Data of one byte is then read to the write buffer position in the buffer memory 13 from the read data position (step S13). A remainder obtained by dividing a value obtained by adding one analysis buffer position by the buffer size is then set as the next analysis starting buffer position (step S14), the process is returned to the step S5 and the analysis is made repeatedly.

Figure 6:
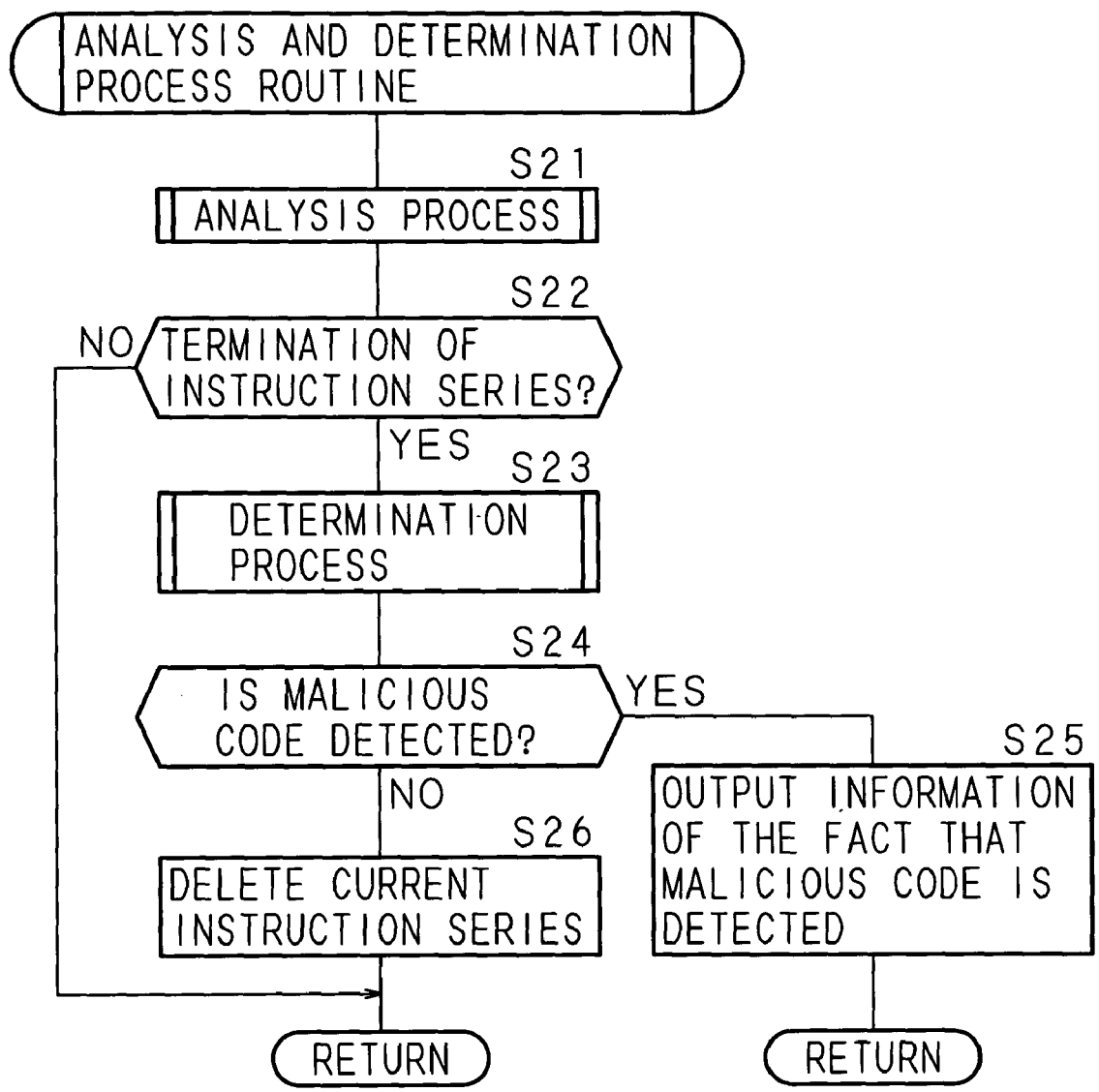
FIG. 6 is a flowchart for explaining the procedure of an analysis and determination process routine.
Figure 9:
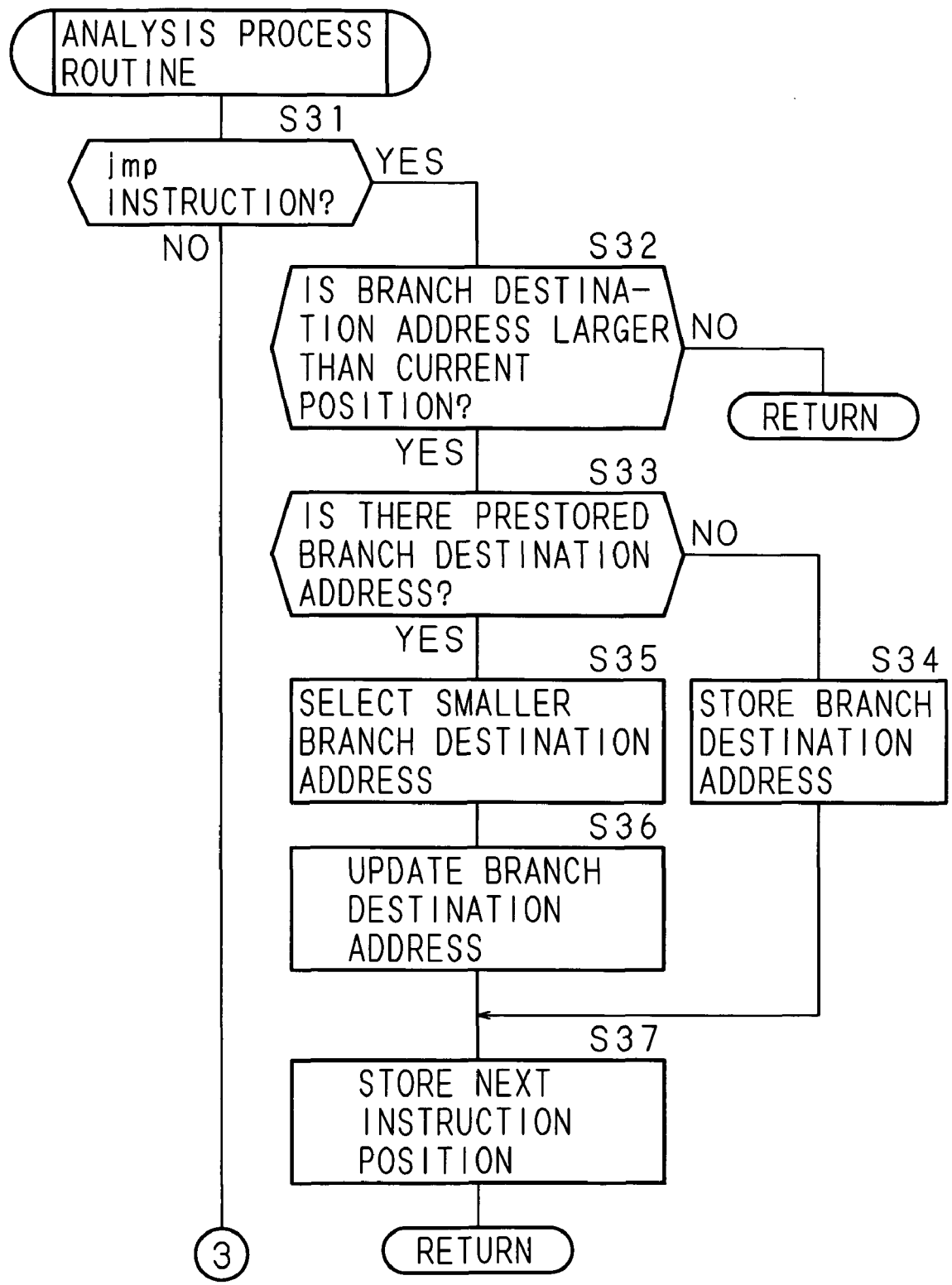
FIG. 9 is a flowchart for explaining the process procedure of the analysis process routine.
Figure 10:
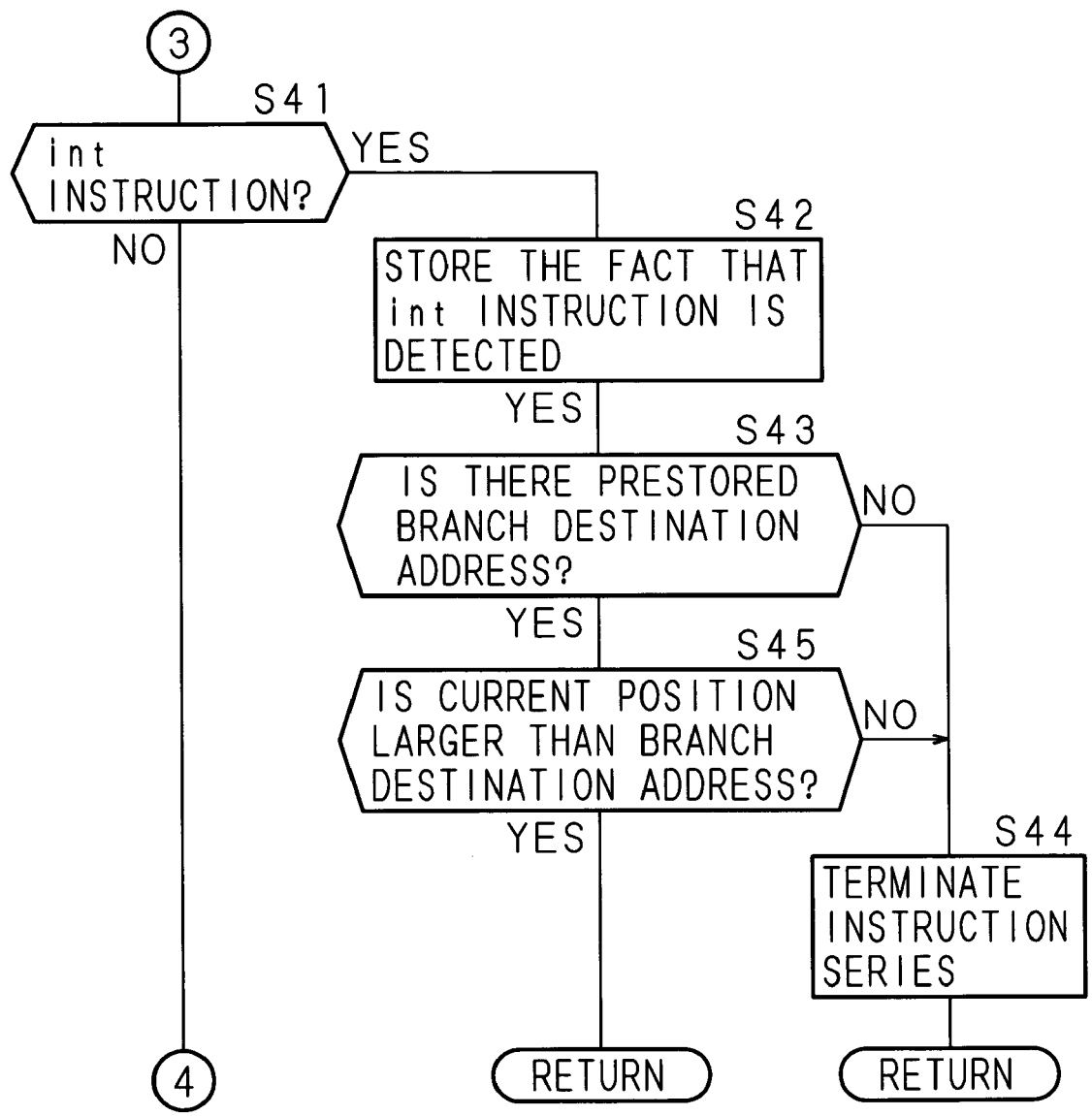
FIG. 10 is a flowchart for explaining the process procedure of the analysis process routine.
Figure 11:
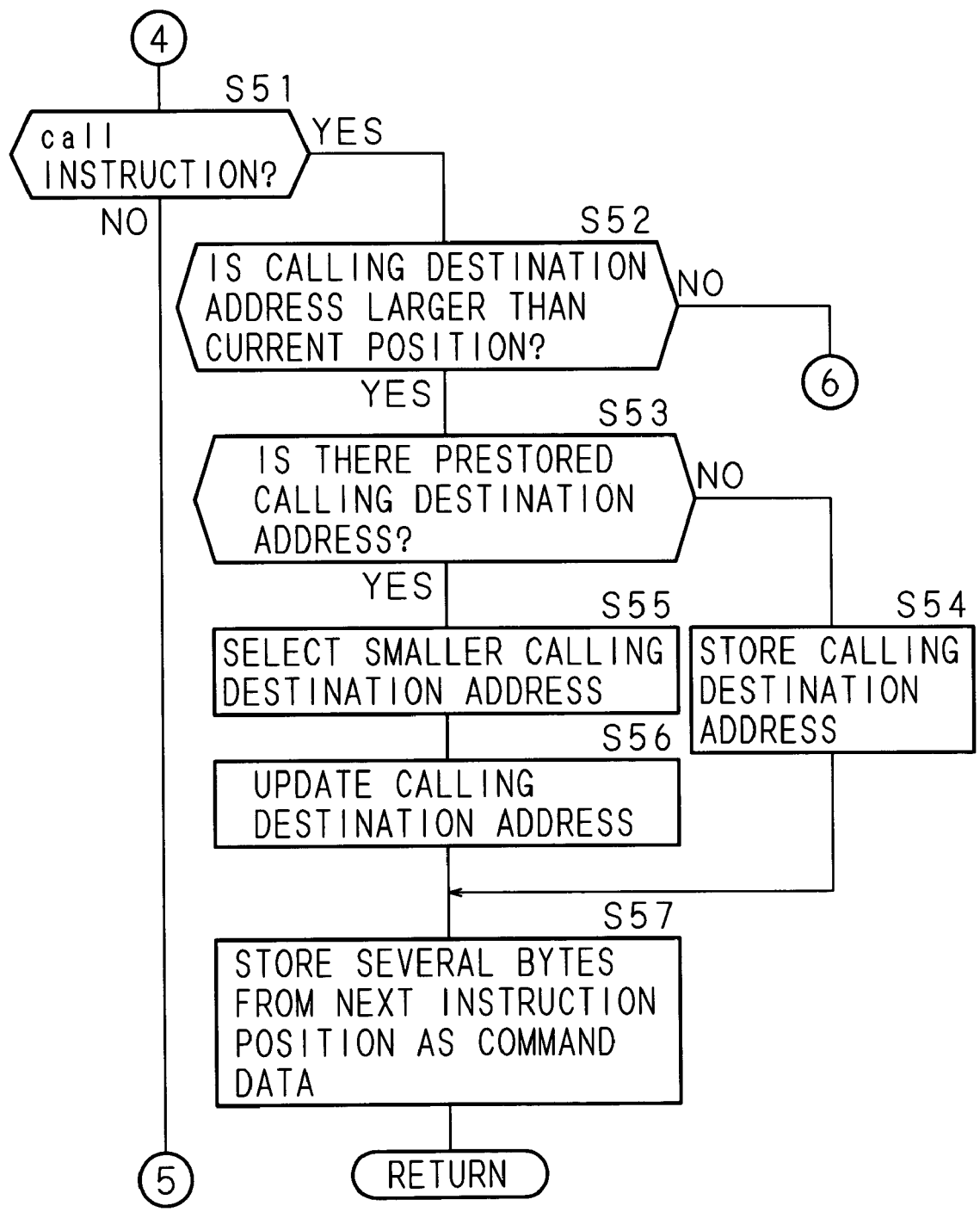
FIG. 11 is a flowchart for explaining the process procedure of the analysis process routine.
Figure 12:
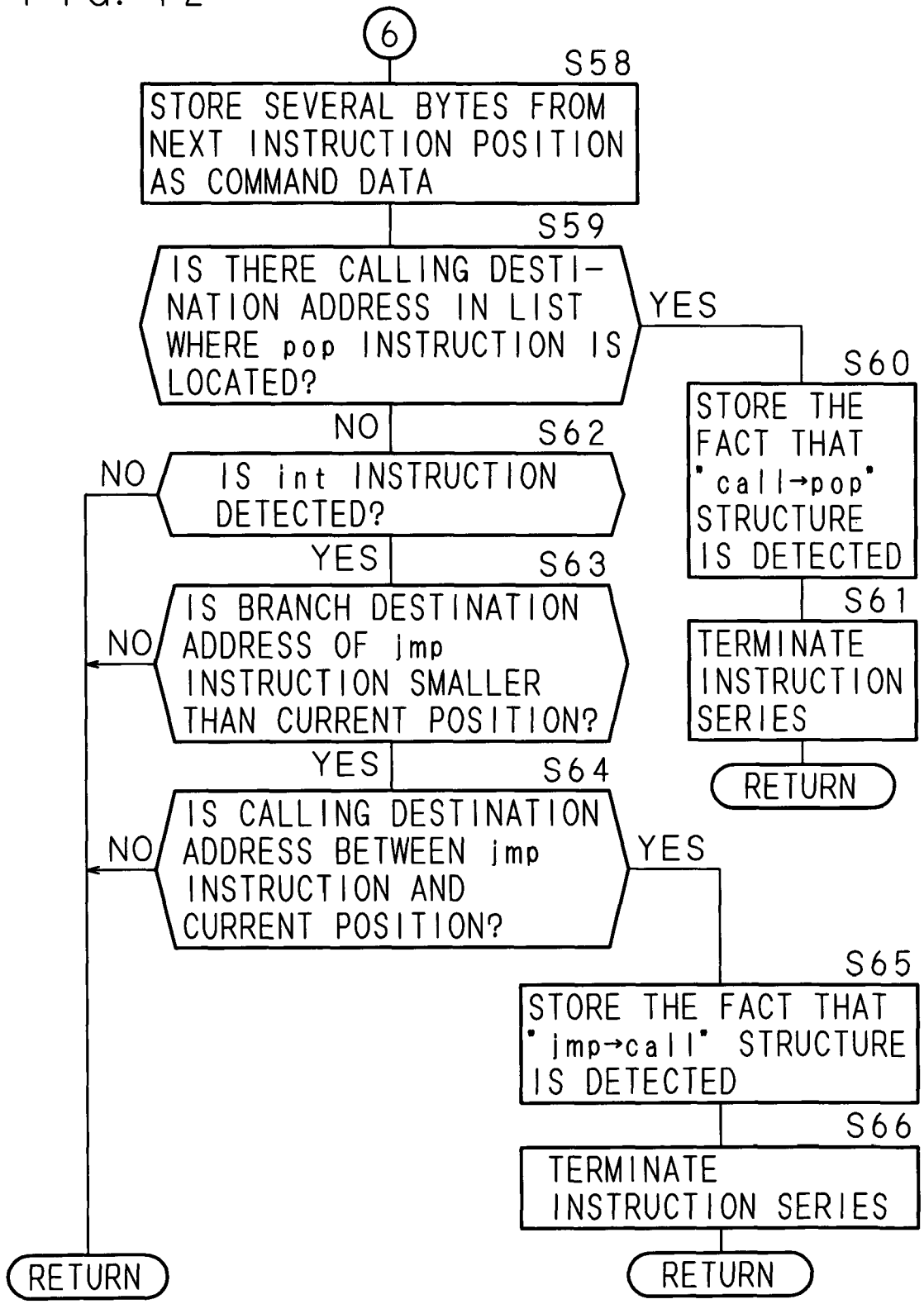
FIG. 12 is a flowchart for explaining the process procedure of the analysis process routine.
Figure 13:
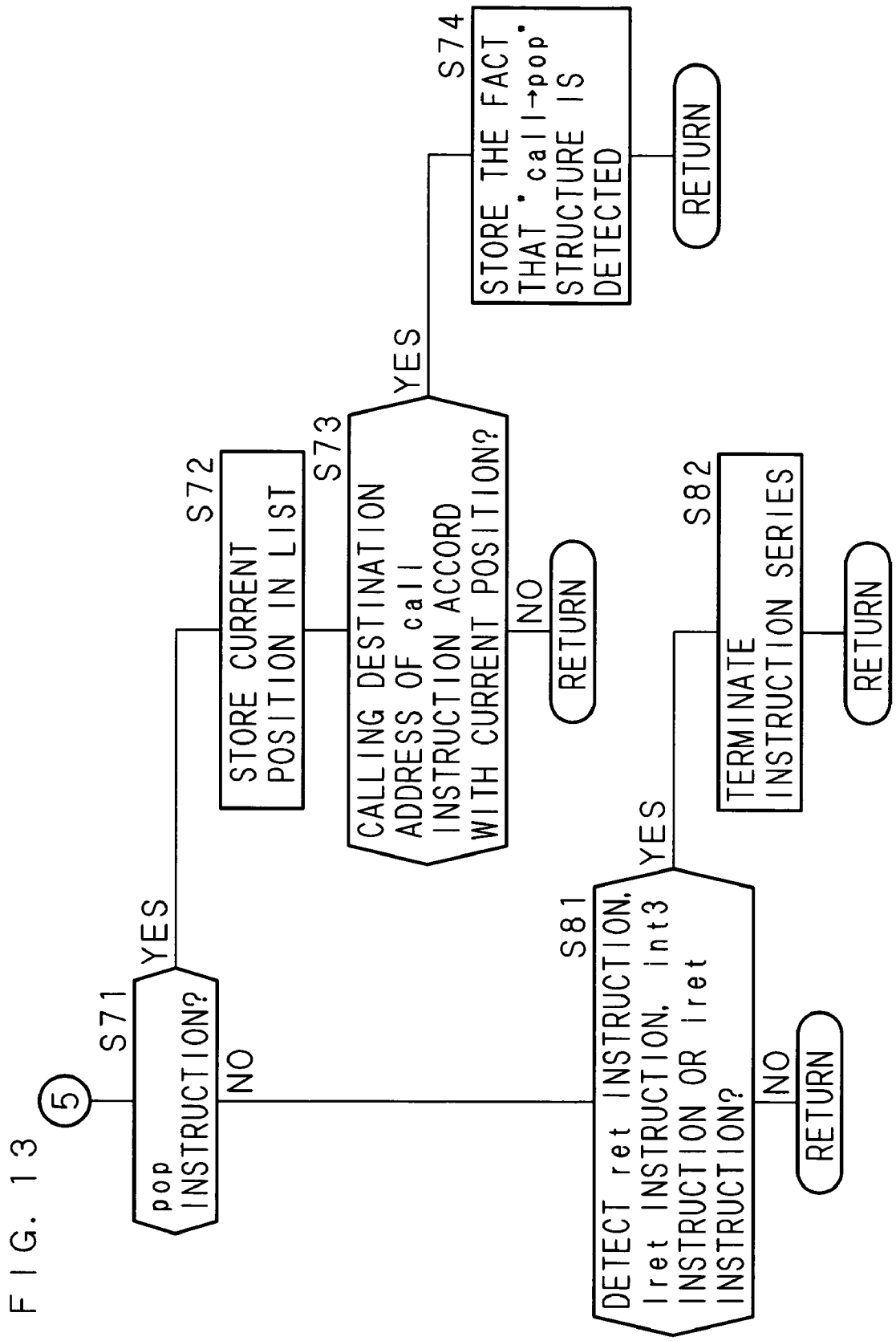
FIG. 13 is a flowchart for explaining the process procedure of the analysis process routine.

FIG. 6 is a flowchart for explaining the procedure of an analysis and determination process routine. An analysis process which will be described below is performed for all instruction series including one byte data read from the buffer memory 13 which corresponds to the first byte of the instruction code (step S21). Although the analysis process will be described below in detail, an analysis is made here by referring to an instruction table based on read one byte data to store the content of the instruction, the parameter to be used, the position of the next instruction and the like and monitoring the state in the virtual stack in the virtual CPU execution environment unit 11a.

When the analysis process is terminated, the CPU 11 judges whether the analyzed instruction series has terminated or not (step S22), and terminates this analysis and determination process routine and goes to the process of the step S11 of FIG. 5 when the instruction series has not terminated (S22: NO).

Alternatively, when it is determined that the instruction series has terminated (S22: YES), a determination process which will be described below is performed (step S23). The CPU 11 then receives the result of the determination process and judges whether a malicious code has been detected or not (step S24), and deletes the current instruction series (step S26) when it is judged that no malicious code has been detected (S24: NO), or outputs information of the fact that a malicious code has been detected (step S25) when it is judged that a malicious code has been detected (S24: YES). Information may be outputted in a form of transmitting information to an information processing apparatus connected with the internal network via the communication interface 15b or in a form of providing a display unit for displaying information as character information or a light emitting unit for announcing information with light in the data processing apparatus 10 and outputting information thereto. Moreover, a process of breaking communication may be performed after outputting information of the fact that a malicious code has bee detected.

FIGS. 7 and 8 are schematic views for explaining an emergence pattern of an instruction code to be detected by the analysis process of the data processing apparatus 10. FIG. 7 shows the essential structure of a malicious code using the "jmp→call" structure while FIG. 8 shows the essential structure of a malicious code using the "call→pop" structure.

As described above, in the "jmp→call" structure, the branch destination of the jmp instruction corresponds to the address of the call instruction and the calling destination of the call instruction exists between the jmp instruction and the call instruction (see FIG. 7(b)). In the example shown in FIG. 7(a), the jmp instruction of the address A1 causes branching to the call instruction of the address A10 and an instruction code group of the addresses A2 to A6 is called by the call instruction. When the call instruction of the address A10 is executed, the return address (A11) of the call instruction is temporarily stored in the stack area. Since the return address stored in the stack area can be obtained by the pop instruction, it becomes possible to use the address as a clue for executing an external command. That is, the malicious code shown in FIG. 7 is constructed to obtain the return address A11 of the call instruction by the pop instruction of the address A2, call system call by an int instruction, which is software interruption, and execute an external command (a shell program, for example) created at the address A11 by an attacker.

Next, the "call→pop" structure has a pop instruction having no preceding push instruction in an instruction code group of a calling destination of the call instruction (see FIG. 8(b)). In the example shown in FIG. 8(a), the call instruction of the address A1 calls an instruction code group of A16 to A20 and a return address of the call instruction is obtained therein by the pop instruction. It should be noted that, although a character string of an external command which is required to be activated just after the call instruction is not arranged and a dummy instruction code having a fixed length preset by the attacker is inserted, an effect similar to the one described above can be also obtained in this case. That is, in the example shown in FIG. 8(a), the pop instruction having no preceding push instruction which exists in an instruction code group of the calling destination of the call instruction obtains a return address A2 of the call instruction, the value of the address A7 is calculated by an arithmetic process to call system call by the int instruction of the address A20 and an external command (shell program) of a character string arranged at the address A7 is executed.

It should be noted that the addresses shown in FIGS. 7 and 8 are addresses which are given for descriptive purposes and not necessarily denote a series of memory addresses in the stack area.

FIGS. 9 to 13 are a flowchart for explaining the process procedure of the analysis process routine. The CPU 11 of the data processing apparatus 10 refers to the instruction table described above to judge whether an instruction series starting from one byte data read from the buffer memory 13 is a jmp instruction or not (step S31). When it is judged that the instruction series is a jmp instruction (S31: YES), it is judged whether the address of a branch destination designated by the jmp instruction is larger than the address of the current position or not (step S32). When it is judged that the address of the branch destination is smaller than the address of the current position (S32: NO), this routine is terminated and the process is returned to the analysis and determination process routine.

Alternatively, when it is judged that the branch destination address is larger than the address of the current position (S32: YES), it is judged whether or not there is a branch destination address prestored in a predetermined storage area (which will be hereinafter referred to as a branch destination table) in the memory 12 (step S33). When there is no branch destination address prestored in the branch destination table (S33: NO), the branch destination address of the jmp instruction detected in the step S31 is stored in the branch destination table (step S34). Alternatively, when there is a prestored address of a branch destination (S33: YES), the smaller branch destination address is selected (step S35) and the branch destination address to be stored in the branch destination table is updated (step S36).

When a branch destination address is updated or stored, the next instruction position is stored in the memory 12 (step S37) and the process is returned to the analysis and determination process routine.

When it is judged in the step S31 that the instruction series is not a jmp instruction (S31: NO), it is judged whether one byte data read from the buffer memory 13 is an int instruction or not (step S41). When it is judged that the one byte data is an int instruction (S41: YES), the fact that an int instruction has been detected is stored in the memory 12 (step S42). It is then judged whether there is a branch destination address prestored in the branch destination table described above or not (step S43). When there is no branch destination table stored in the branch destination table (S43: NO), an instruction series which is being analyzed is terminated (step S44) and the process is returned to the analysis and determination routine and goes to the determination process which will be described below.

Alternatively, when there is a prestored branch destination address (S43: YES), it is judged whether the address of the current position is larger than the branch destination address stored in the branch destination table or not (step S45). When the address of the current position is smaller than the stored branch destination address (S45: NO), the instruction series which is being analyzed is terminated (S44) and the process is returned to the analysis and determination process routine and goes to the determination process. Alternatively, when the address of the current position is larger than the stored branch destination address (S45: YES), the process is returned to the analysis and determination process routine without terminating the instruction series.

When it is judged in the step S41 that the one byte data is not an int instruction (S41: NO), it is judged whether an instruction code starting from the one byte data read from the buffer memory 13 is a call instruction or not (step S51). When it is judged that the instruction code is a call instruction (S51: YES), it is judged whether the calling destination address of the call instruction is larger than the address of the current position or not (step S52). When it is judged that the calling destination address is larger than the address of the current position (S52: YES), it is judged whether there is a prestored calling destination address or not (step S53). When there is no prestored calling destination address (S53: NO), the calling destination address of the call instruction detected in the step S51 is stored (step S54). Alternatively, when there is a prestored calling destination address (S53: YES), the smaller calling destination address is selected (step S55) and a calling destination address to be stored is updated (step S56).

When a calling destination address is updated or stored, data of several bytes from the next instruction position is stored as command data in the memory 12 (step S57).

When it is judged in the step S52 that the calling destination address of the call instruction detected in the step S51 is smaller than the current position (S52: NO), data of several bytes from the next instruction position is stored as command data in the memory 12 (step S58).

It is then judged whether there is a calling destination address in a list of a position where a pop instruction is located or not (step S59). Here, a list is a storage area storing an address where a pop instruction is located in a list form. When it is judged that there is a calling destination address in the list (S59: YES), the fact that the "call→pop" structure has been detected is stored in the memory 12 (step S60) and an instruction series which is being analyzed is terminated (step S61). When the instruction series is terminated, the process is returned to the analysis and determination process routine and goes to the determination process.

When it is judged that there is no calling destination address in the list (S59: NO), it is judged whether an int instruction is detected or not (step S62), and the process is returned to the analysis and determination process routine without terminating the instruction series when the int instruction is not detected (S62: NO).

When an int instruction is detected (S62: YES), the branch destination table is referred to and it is judged whether a branch destination address of the jmp instruction is smaller than the address of the current position or not (step S63). When it is judged that the branch destination address is larger than the current position (S63: NO), the process is returned to the analysis and determination process routine without terminating the instruction series.

When it is judged that the branch destination address is smaller than the current position (S63: YES), it is judged whether the calling destination address exists between the jmp instruction and the current position or not (step S64). When the calling destination address does not exist between the jmp instruction and the current position (S64: NO), the process is returned to the analysis and determination process routine without terminating the instruction series. Alternatively, when it is judged that the calling destination address exists between the jmp instruction and the current position (S64: YES), the fact that the "jmp→call" structure has been detected is stored in the memory 12 (step S65) and the instruction series which is being analyzed is terminated (step S66). When the instruction series is terminated, the process is returned to the analysis and determination process routine and goes to the determination process.

When it is judged in the step S51 that the instruction code is not a call instruction (S51: NO), it is judged whether an instruction code starting from one byte data read from the buffer memory 13 is a pop instruction or not (step S71). When it is judged that the instruction code is a pop instruction (S71: YES), the address of the current position is stored in the list (step S72). It is then judged whether the calling destination address of the call instruction accords with the address of the current position or not (step S73). When the calling destination address accords (S73: YES), the fact that the "call→pop" structure has been detected is stored in the memory 12 (step S74) and the process is returned to the analysis and determination process routine. Alternatively, when the calling destination address of the call instruction does not accord with the address of the current position (S73: NO), the process is returned to the analysis and determination process routine.

It should be noted that the instruction boundary is sometimes interpreted improperly and the "jmp→call" structure and the "call→pop" structure sometimes cannot be detected in one instruction series in a case where dummy data is inserted between a jmp instruction and a call instruction or between a call instruction and a pop instruction in data to be detected. However, in the present embodiment, since the branch destination address and the calling destination address are analyzed respectively as a starting position of the next instruction code when a jmp instruction having a branch destination address larger than the next instruction position and a call instruction having a calling destination address larger than the next instruction position are detected, the "jmp→call" structure and the "call→pop" structure described above can be detected even when dummy data is inserted.

When it is judged in the step S71 that the instruction code is not a call instruction (S71: NO), it is judged whether the one byte data read from the buffer memory 13 is any one of a ret instruction, a lret instruction, an int3 instruction and an iret instruction or not (step S81). All of these instructions denote instructions for returning control from the routine of the calling destination to the routine of the calling source. When the one byte data is any one of the instructions described above (S81: YES), the instruction series which is being analyzed is terminated (step S82) and the process is returned to the analysis and determination process routine. Alternatively, when it is judged that the one byte data is none of the instructions described above (S81: NO), the process is returned to the analysis and determination process routine without terminating the instruction series.

Figure 14:
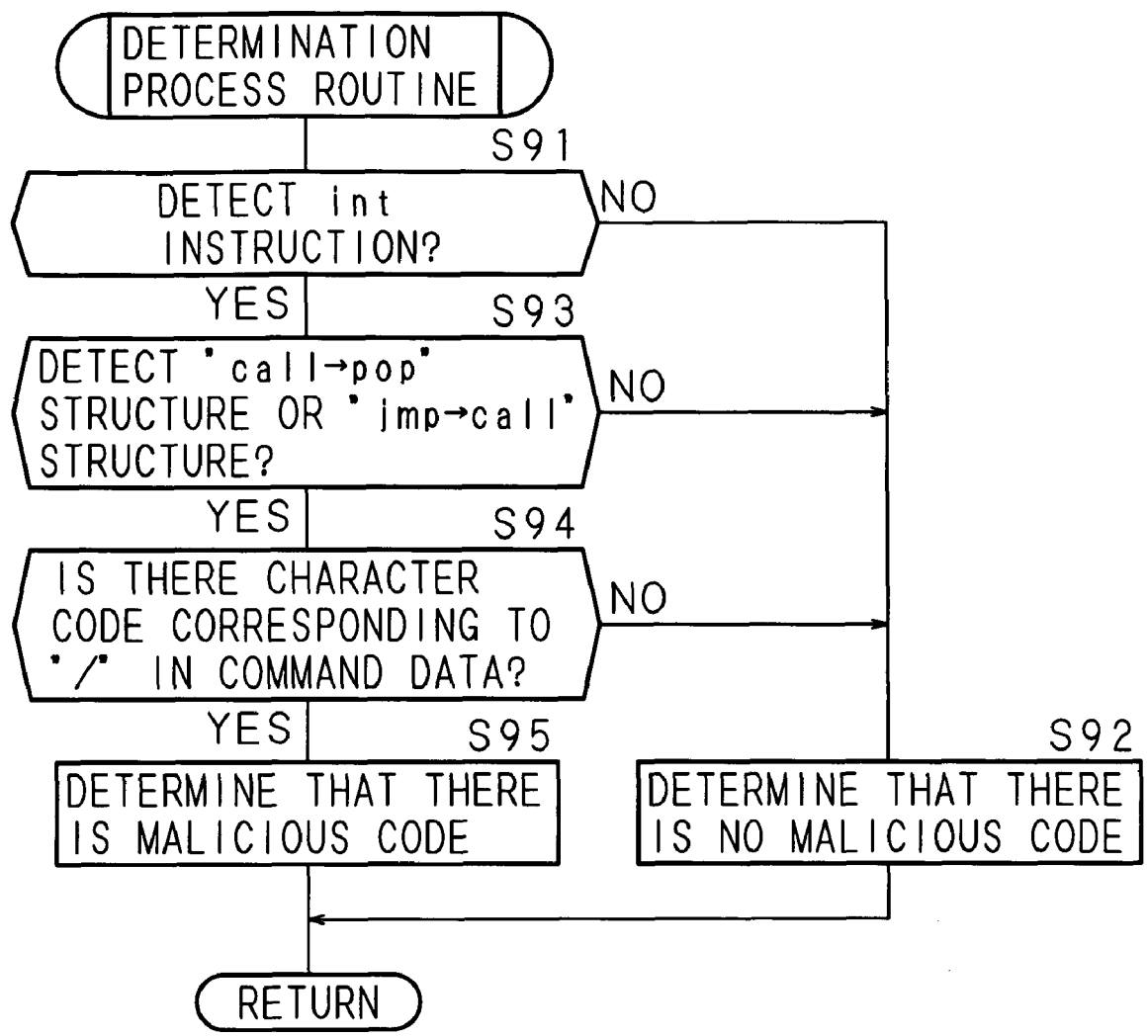
FIG. 14 is a flowchart for explaining the process procedure of the determination process routine.
Figure 15:
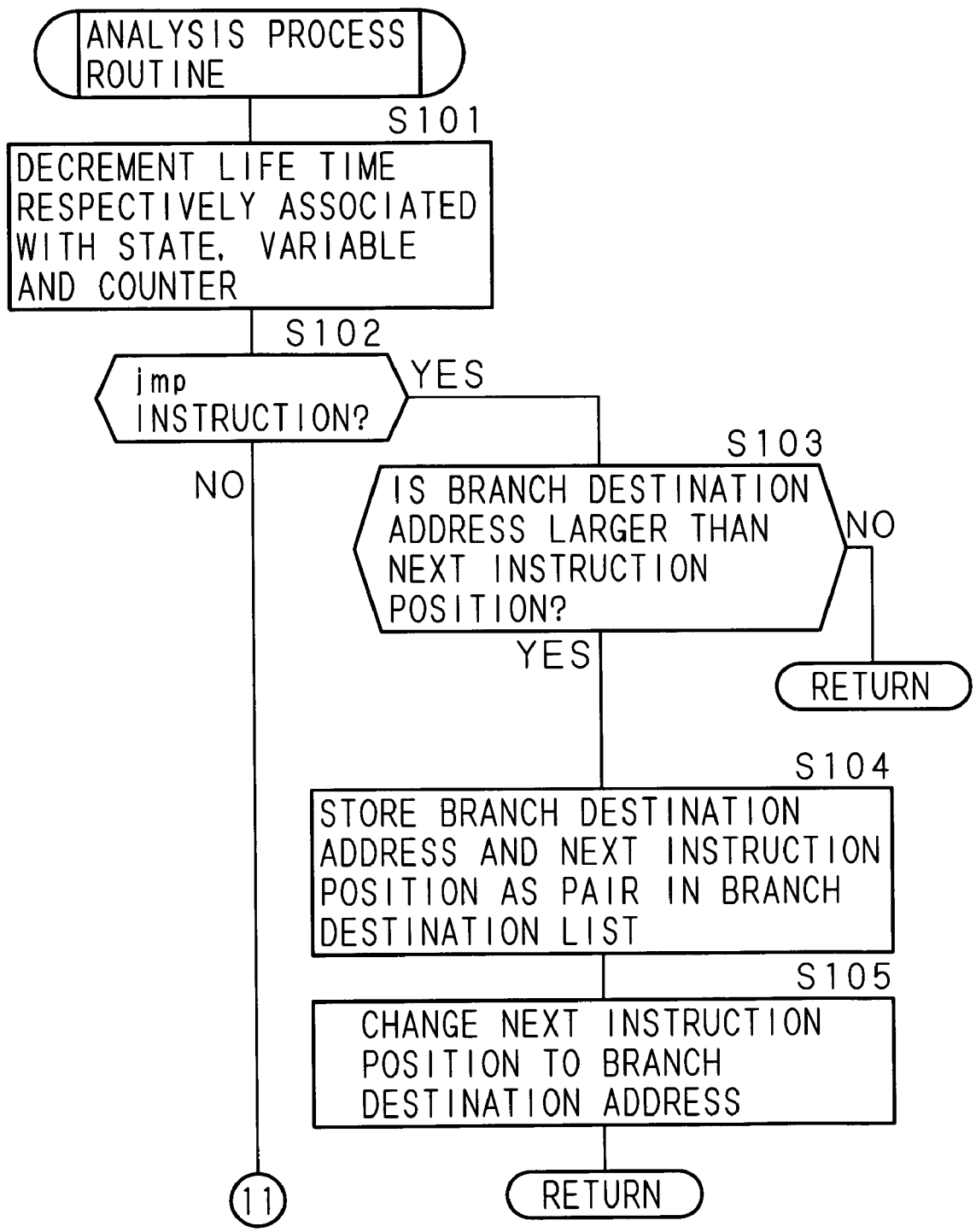
FIG. 15 is a flowchart for explaining the process procedure of an analysis process routine according to the present embodiment.
Figure 16:
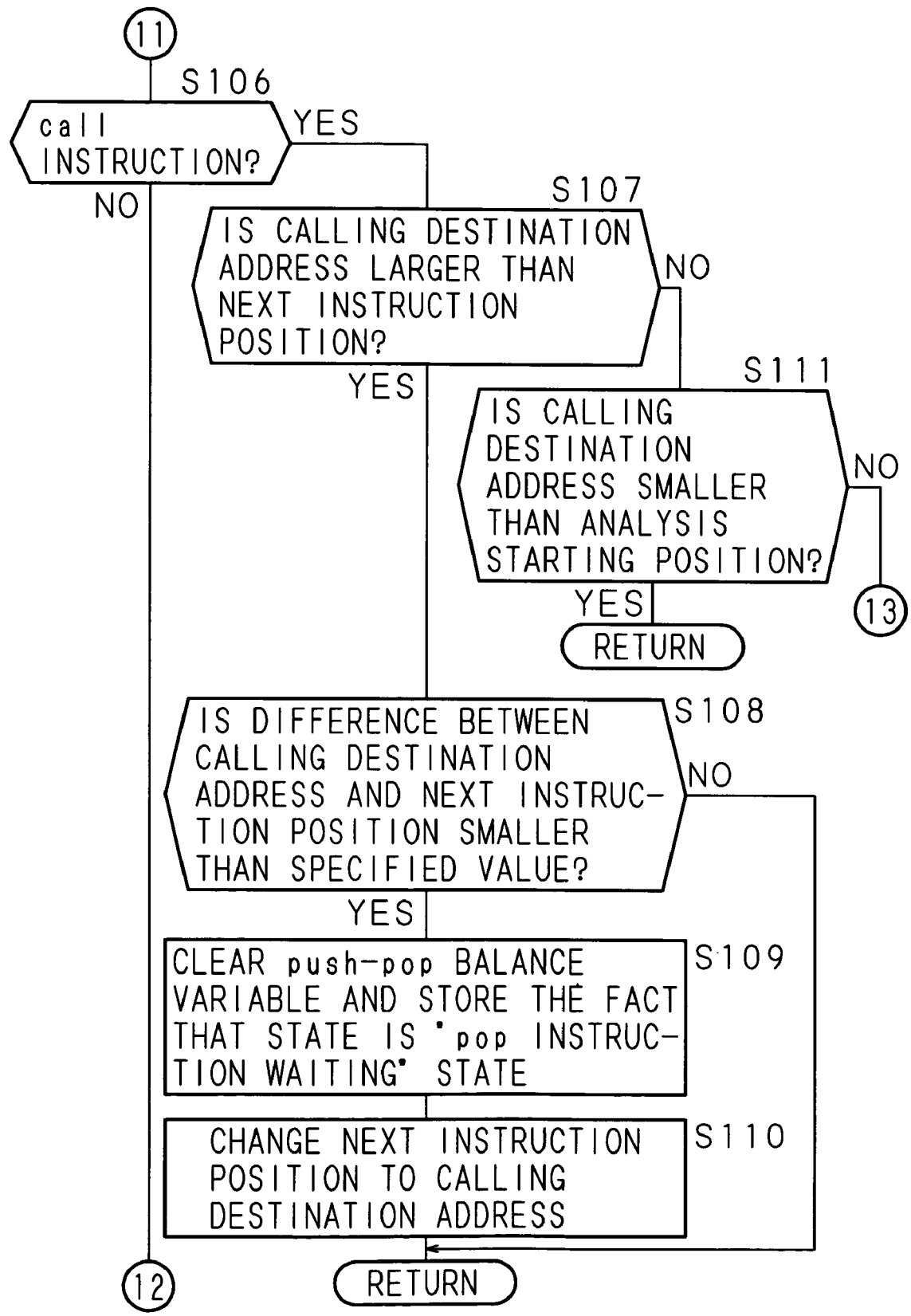
FIG. 16 is a flowchart for explaining the process procedure of the analysis process routine according to the present embodiment.
Figure 17:
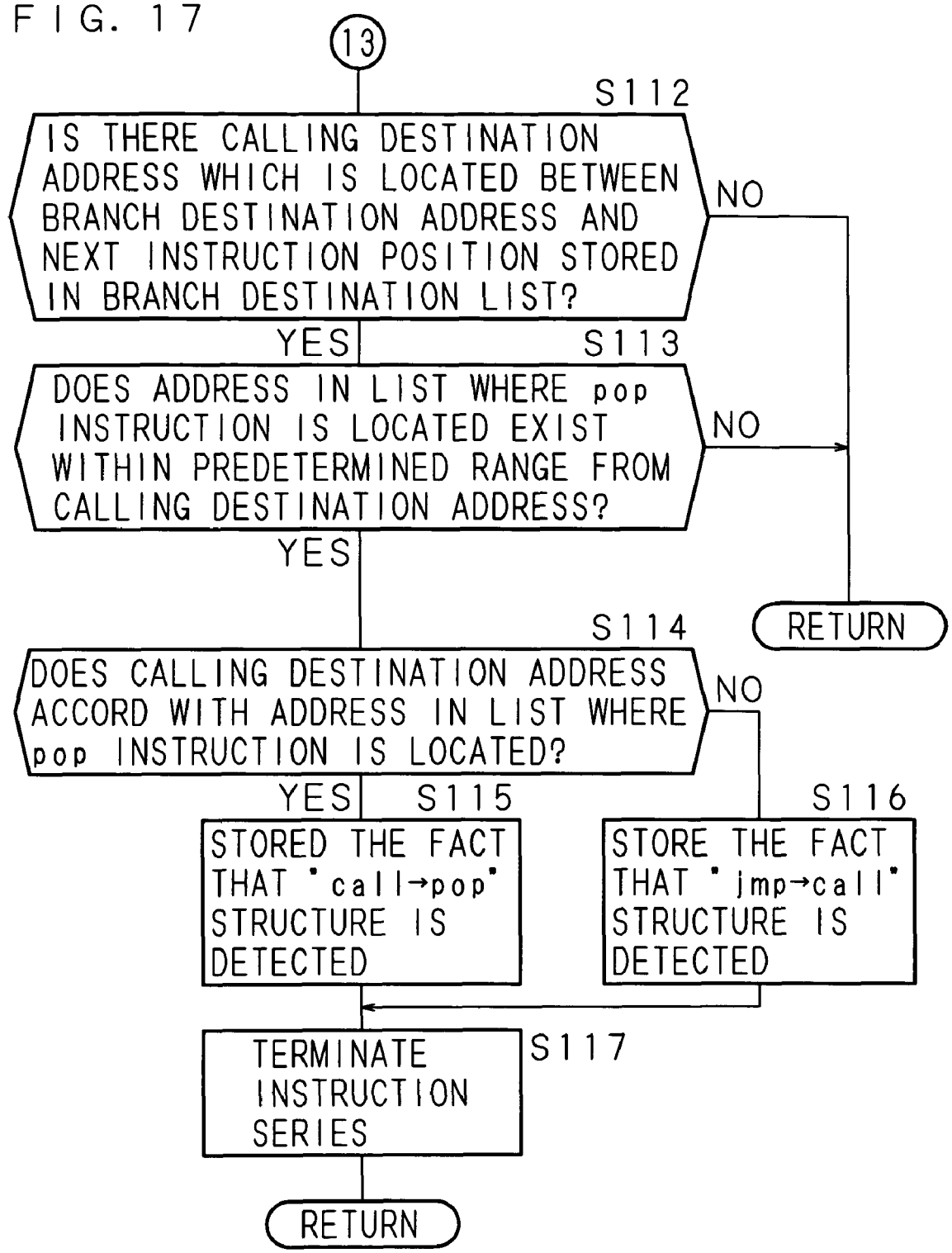
FIG. 17 is a flowchart for explaining the process procedure of the analysis process routine according to the present embodiment.
Figure 18:
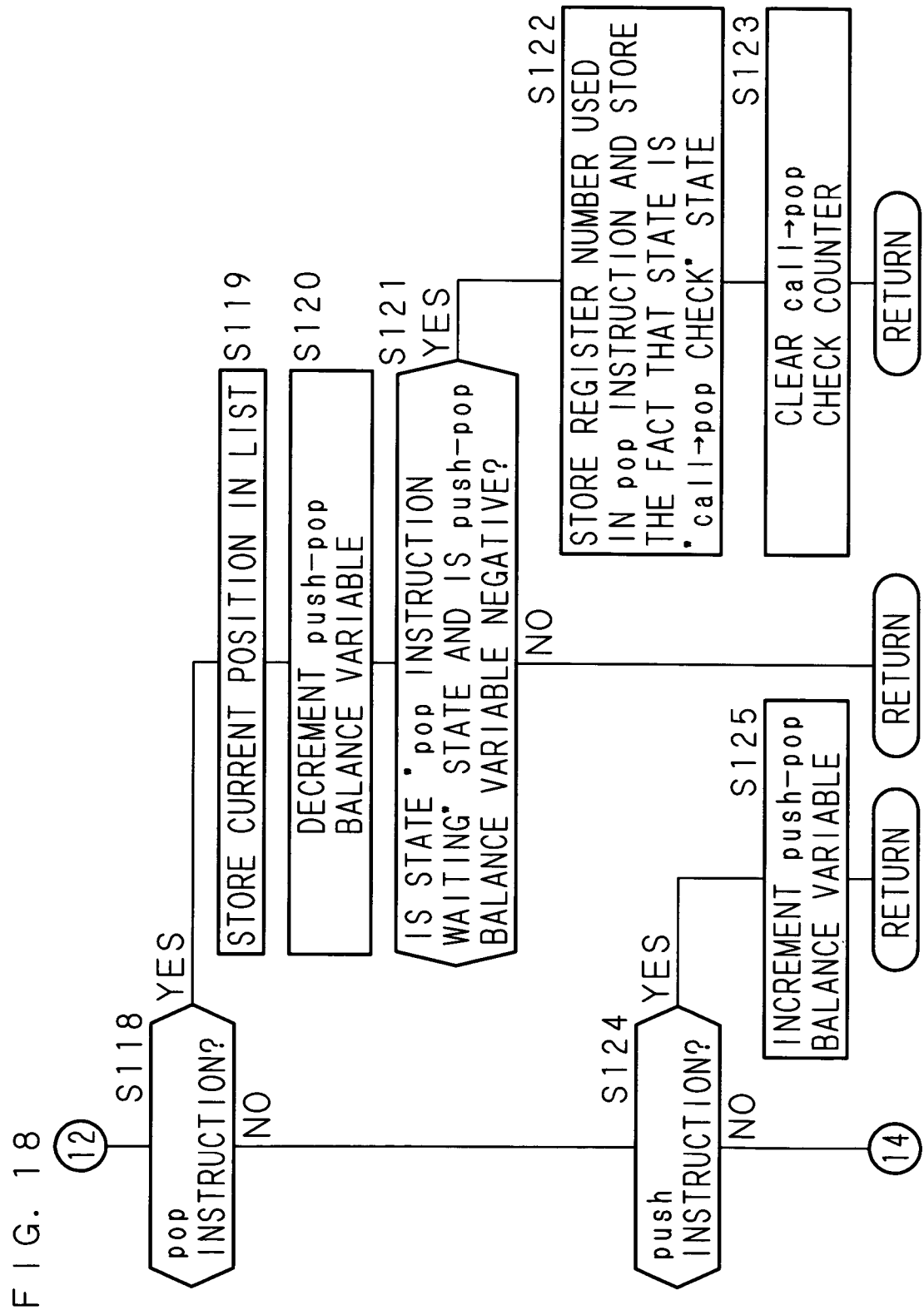
FIG. 18 is a flowchart for explaining the process procedure of the analysis process routine according to the present embodiment.
Figure 19:
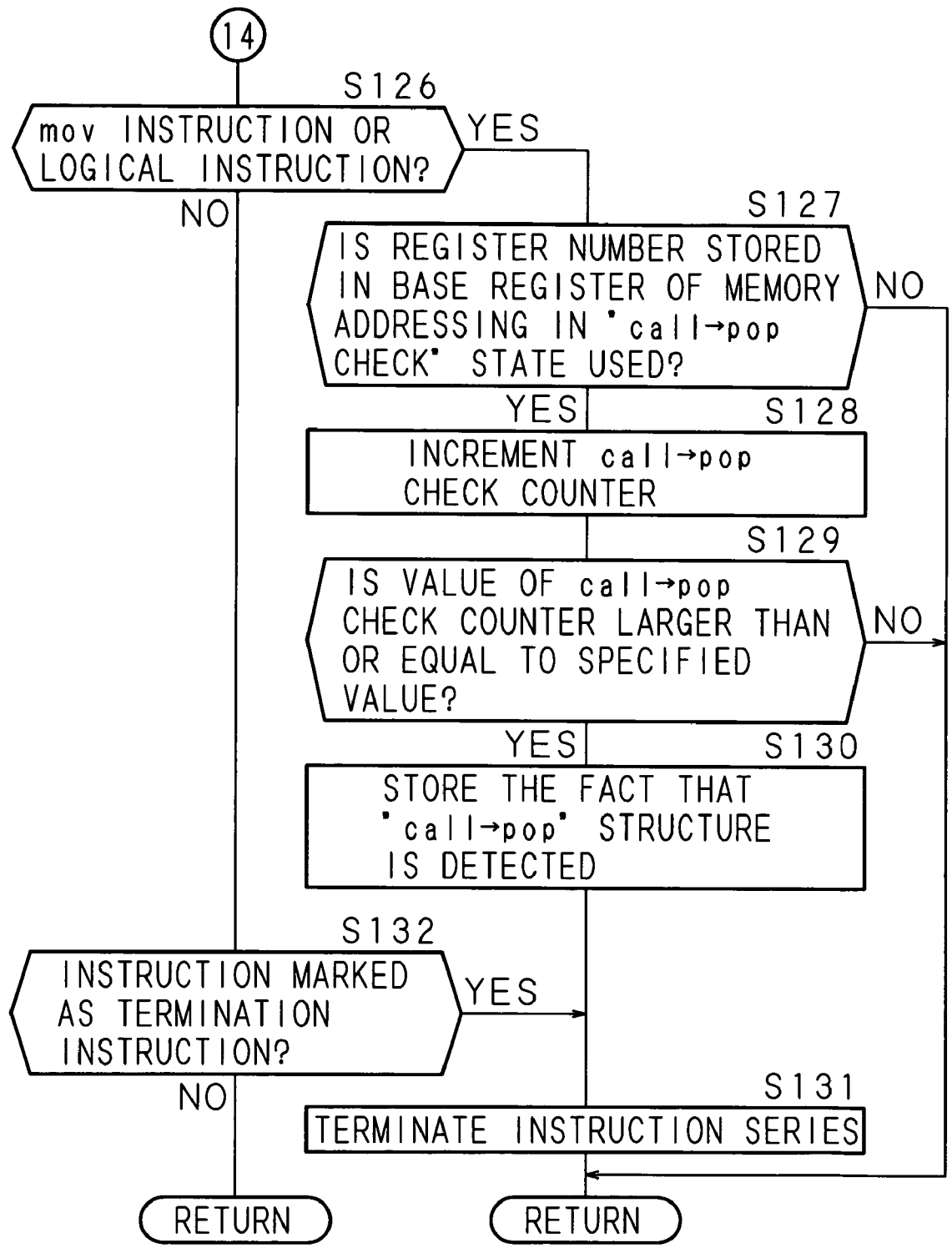
FIG. 19 is a flowchart for explaining the process procedure of the analysis process routine according to the present embodiment.

FIG. 14 is a flowchart for explaining the process procedure of the determination process routine. The CPU 11 of the data processing apparatus 10 judges whether an int instruction is detected in an instruction series which is terminated by the analysis process routine described above or not (step S91). When the int instruction is not detected (S91: NO), it is determined that there is no malicious code (step S92) since no system call is called by an interruption process to execute an external command.

When an int instruction is detected in an instruction series which is terminated by the analysis process (S91: YES), the CPU 11 judges whether the "call→pop" structure or the "jmp→call" structure is detected or not (step S93). When none of the structures is detected (S93: NO), it is judged that there is no malicious code (S92).

When any one of the "call→pop" structure and the "jmp→call" structure has been detected (S93: YES), it is judged whether there is a character code corresponding to "/" which denotes a delimiter of a path in command data or not (step S94). When there is no character code in the command data (S94: NO), it is determined that there is no malicious code (S92). Alternatively, when there is the character code in the command data (S94: YES), it is judged that the probability of calling of a system call by an interruption process and execution of an external command (shell code) is high and it is determined that there is a malicious code (step S95).

It should be noted that, although collateral determination is performed by judging whether "/" which denotes a delimiter of a path is included in an external command or not in order to enhance the detection accuracy of a malicious code in the present embodiment, it may be determined that there is a malicious code in the stage where the "jmp→call" structure or the "call→pop" structure is detected in the step S93. Accordingly, collateral determination by the step S94 may be performed when the apparatus is planned to be used in an environment requiring high detection accuracy and may be omitted when the apparatus is planned to be used in an environment not requiring high detection accuracy.

Moreover, although "/" was given as an example of a character code denoting a delimiter of a path in the present embodiment, "¥" is sometimes used as a character code denoting a delimiter of a path in a different type of CPU to be protected and the character code to be used for collateral determination is not limited to "/", and it is therefore necessary to preset the character code according to the type of the CPU to be protected.

Second Embodiment

In addition to the technique for detecting a malicious code using the analysis and determination process routine explained in the First Embodiment, a malicious code can be detected using a routine to be explained in this embodiment. It should be noted that the structure of hardware of the data processing apparatus 10, the routine relating to reading of data shown in FIGS. 4 and 5 and the analysis and determination process routine shown in FIG. 6 can be directly incorporated in this embodiment and explanation thereof will be omitted.

FIGS. 15 to 19 are a flowchart for explaining the process procedure of an analysis process routine according to the present embodiment. First of all, the CPU 11 of the data processing apparatus 10 decrements life time respectively associated with a state, a variable and a counter (step S101). In the present embodiment, a state, a variable and a counter are introduced as parameters for denoting a state in the course of analysis and a positive specified value is set as a life time when the respective parameters are set. As described below, introduced as the state is a "pop instruction waiting" state which denotes a state of waiting for emergence of a pop instruction, or a "call→pop check" state which denotes a state where the "call→pop" structure is to be verified. Moreover, introduced as the variable is a push-pop balance variable for checking balance of the number of emergence times of a push instruction and a pop instruction. Moreover, a call→pop check counter for counting a state where the probability of emergence of the "call→pop" structure is high is introduced to the counter. The life time is a value preset for each parameter and is decreased by one for each repetition of the analysis process routine so as to show the effectiveness for the number of execution times of the analysis process routine. It should be noted that life time which has become zero as a result of decrement of life time at this step is initialized here.

The CPU 11 then refers to the instruction table to judge whether one byte data read from the buffer memory 13 is a jmp instruction or not (step S102). When it is judged that the one byte data is a jmp instruction (S102: YES), a judgment is made whether a branch destination address designated by the jmp instruction is larger than the next instruction position or not (step S103). When it is judged that the branch destination address is smaller than the next instruction position (S103: NO), this routine is terminated and the process is returned to the analysis and determination process routine.

Alternatively, when it is judged that the branch destination address is larger than the next instruction position (S103: YES), the branch destination address and the next instruction position are stored as a pair in the branch destination list (step S104). Here, the branch destination list is a storage area of a list form where a plurality of addresses can be stored and the storage area is secured in the memory 12. Then, after changing the next instruction position to the branch destination address (step S105), the process is returned to the analysis and determination process routine.

When it is judged in the step S102 that the one byte data is not a jmp instruction (S102: NO), the CPU 11 judges whether one byte data read from the buffer memory 13 is a call instruction or not (step S106). When it is judged that the one byte data is a call instruction (S106: YES), a judgment is made whether a calling destination address is larger than the next instruction position or not (step S107). When it is judged that the calling destination address is larger than the next instruction position (S107: YES), it is judged whether a difference between the calling destination address and the next instruction position is smaller than a specified value (approximately 10 bytes, for example) or not (step S108). When it is judged that the difference is larger than the specified value (S108: NO), the process is returned to the analysis and determination process routine.

When it is judged that the difference is smaller than the specified value (S108: YES), the push-pop balance variable is cleared and the fact that the state is the "pop instruction waiting" state is stored (step S109). In the present embodiment, when the calling destination address is within a range of approximately 10 bytes from the call instruction, the push-pop balance variable is introduced in order to detect a pop instruction having no preceding push instruction. That is, the push-pop balance variable is incremented when a push instruction is found after the step S1118 while the push-pop balance variable is decremented when a pop instruction is found, and the positive and negative of the push-pop balance variable is conclusively determined so as to detect a pop instruction having no preceding push instruction.

After storing the fact that the state is the "pop instruction waiting" state, the CPU 11 changes the next instruction position to a calling destination address (step S110) and returns the process to the analysis and determination process routine.

On the other hand, when it is judged in the step S107 that the calling destination address of the call instruction is smaller than the next instruction position (S107: NO), it is judged whether the calling destination address is smaller than the analysis starting position or not (step S111). When it is judged that the calling destination address is smaller than the analysis starting position (S111: YES), the process is returned to the analysis and determination process routine. Alternatively, when it is judged that the calling destination address is larger than the analysis starting position (S111: NO), a judgment is made whether there is one having a calling destination address positioned between the branch destination address and the next instruction position stored in the branch destination list described above or not (step S112). When there is one having a calling destination address positioned between the next instruction position and the branch destination address (S112: YES), it is judged whether the address in the list where the pop instruction is located exists within a predetermined range (several bytes, for example) from the calling destination address or not (step S113).

When the address in the list where the pop instruction is located exists within the predetermined range from the calling destination address (S113: YES), it is judged whether the calling destination address accords with an address in the list where the pop instruction is located or not (step S114). Then, when it is judged that the calling destination address accords (S114: YES), the fact that the "call→pop" structure has been detected is stored (step S115) while, when the calling destination address does not accord (S114: NO), the fact that the "jmp→call" structure has been detected is stored (step S116). Then, the instruction series is terminated (step S117) and the process is returned to the analysis and determination process routine. It should be noted that the process is returned to the analysis and determination process routine without terminating the instruction series when the calling destination address does not exist between the next instruction position and the branch destination address in the step S112 (S112: NO) and when the address in the list where the pop instruction is located does not exist within the predetermined range from the calling destination address in the step S113 (S113: NO).

When it is judged in the step S106 that the one byte data is not a call instruction (S106: NO), the CPU 11 judges whether the one byte data read from the buffer memory 13 is a pop instruction or not (step S118). When it is judged that the one byte data is a pop instruction (S118: YES), the current position is stored in the list (step S119) and the push-pop balance variable is decremented (step S120). The CPU 11 then judges whether the current state is the "pop instruction waiting" state and the push-pop balance variable is negative or not (step S121). When it is judged that the current state is the "pop instruction waiting" state and the push-pop balance variable is negative (S121: YES), the register number used in the pop instruction is stored and the fact that the state is the "call→pop check" state is stored in the memory 12 (step S122). Then, the call→pop check counter is cleared (step S123) and then the process is returned to the analysis and determination routine. Alternatively, when the state is not the "pop instruction waiting" state or when the push-pop balance variable is not negative (S121: NO), this routine is terminated and the process is returned to the analysis and determination process routine.

When it is judged in the step S118 that the one byte data is not a pop instruction (S118: NO), the CPU 11 judges whether the one byte data read from the buffer memory 13 is a push instruction or not (step S124). When it is judged that the one byte data is a push instruction (S124: YES), the push-pop balance variable is incremented (step S125) and then the process is returned to the analysis and determination process routine.

When it is judged in the step S124 that the one byte data is not a push instruction (S124: NO), the CPU 11 judges whether the one byte data read from the buffer memory 13 is either a mov instruction or a logical instruction or not (step S126). When it is judged that the one byte data is a mov instruction or a logical instruction (S126: YES), it is judged whether a register number stored in a base register of memory addressing in the "call→pop check" state is being used or not (step S127). When it is judged that the register number is being used (S127: YES), the call→pop check counter is incremented (step S128) and it is judged whether the value of the call→pop check counter is larger than or equal to a specified value (approximately 3 to 5, for example) or not (step S129). When it is judged that the value of the call→pop check counter is larger than or equal to the specified value (S129: YES), the fact that the "call→pop" structure has been detected is stored (step S130), the instruction series is terminated (step S131) and then the process is returned to the analysis and determination process routine. It should be noted that the process is returned to the analysis and determination process routine without terminating the instruction series when it is judged in the step S127 that the stored register number is not being used (S127: NO) and when it is judged in the step S129 that the value of the call→pop check counter is smaller than the specified value (S129: NO).

When it is judged in the step S126 that the one byte data is neither a mov instruction nor a logical instruction (S126: NO), a judgment is made whether the one byte data is an instruction marked as a termination instruction or not (step S132). In the present embodiment in which an instruction table defining the relation between the instruction code and the instruction length or the like of the instruction code is used, it is possible to judge whether data is an instruction marked as a termination instruction or not by preliminarily marking a termination instruction in the instruction table. An instruction to be marked as a termination instruction includes the following: (1) a protection function instruction used only in a system program (ARPL, LGDT, LIDT, SGDT, SIDT, LLDT, LTR, SLDT, STR, LMSW, SMSW, LAR, LSL, VERW, CLTS, HLT, MOV for a control register or a debug register and the like), (2) an instruction using a segment selector (mov, push, a part of pop, LES, LDS and the like), (3) an input-output instruction (IN, OUT, INS, OUTS and the like), (4) an instruction which is rarely used (DAA, DAS, AAA, AAS, BOUND, PUSHF, POPF, SAHF, LAFH) and (5) an instruction for indicating initiation and termination of an interruption routine or a function (ENTER, LEAVE, RET, LRET, INT3, INTO, IRET). It should be noted that these instructions are instructions specific to a particular CPU and it should be understood that an instruction to be marked as a termination instruction changes when a CPU to be protected changes. When it is judged in the step S132 that the one byte data is an instruction marked as a termination instruction (S132: YES), the instruction series in the course of analysis is terminated (S131) and then the process is returned to the analysis and determination process routine while, and when it is judged that the one byte data is not an instruction marked as a termination instruction (S132: NO), the process is returned to the analysis and determination process routine without terminating the instruction series. Moreover, the instruction series may be terminated and then the process may be returned to the analysis and determination process routine when an instruction having a malicious addressing form is detected and when use of a malicious prefix is detected, instead of detection of a termination instruction.

Figure 20:
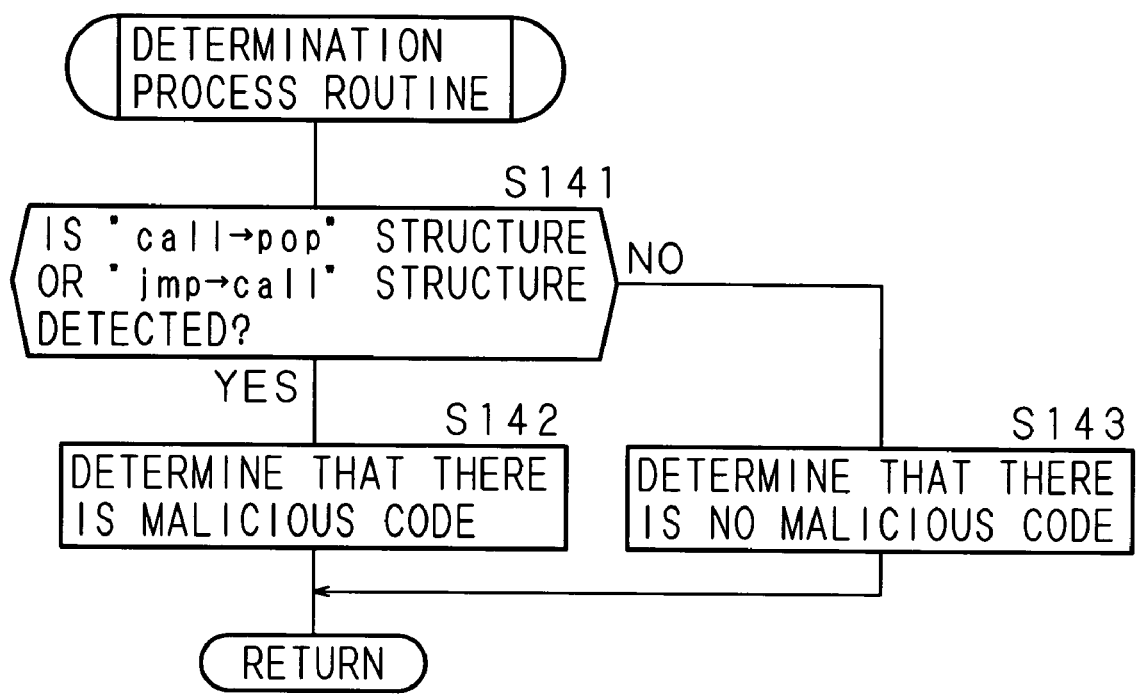
FIG. 20 is a flowchart for explaining the process procedure of a determination process routine according to the present embodiment.

FIG. 20 is a flowchart for explaining the process procedure of a determination process routine according to the present embodiment. In this determination process routine, the CPU 11 of the data processing apparatus 10 judges whether the "call→pop" structure or the "jmp→call" structure has been detected or not (step S141). When it is judged that any one of the structures has been detected (S141: YES), it is determined that there is a malicious code (step S142), while when it is judged that none of the structures has been detected (S141: NO), it is determined that there is no malicious code (step S143). The process is then returned to the analysis and determination process routine.

Third Embodiment

Although a form in which the present invention is applied to a relay device, such as a router, a broadband router or a switch, to be used for data communication has been explained in the First Embodiment, the present invention can be applied to an information processing apparatus having a communication function such as a personal computer, a server apparatus, a mobile telephone and a PDA.

Figure 21:
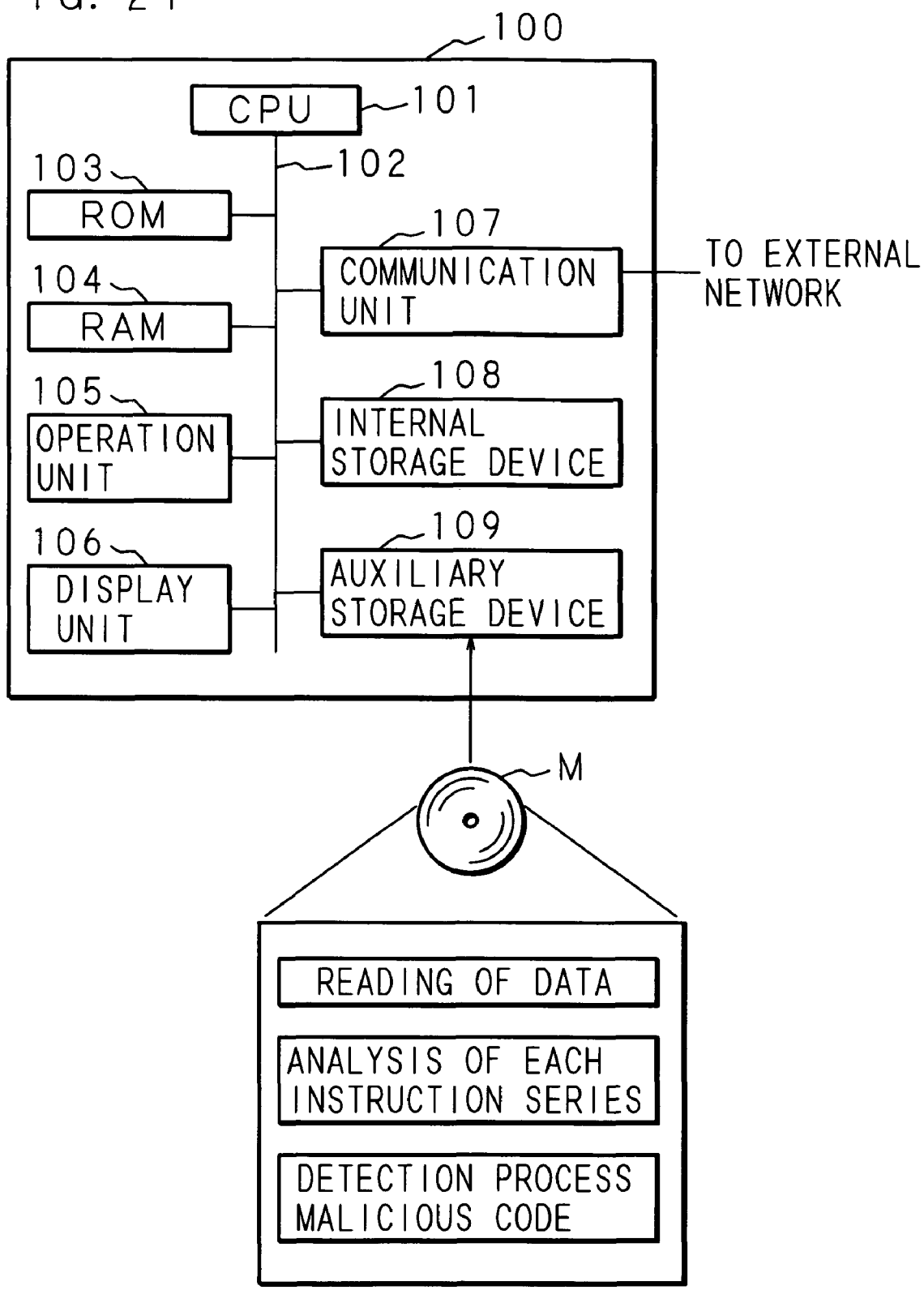
FIG. 21 is a schematic view for explaining the structure of a data processing apparatus according to the present embodiment.

FIG. 21 is a schematic view for explaining the structure of a data processing apparatus according to the present embodiment. Denoted at 100 in the figure is an information processing apparatus such as a personal computer, which comprises a CPU 101 and is connected with various kinds of hardware such as a ROM 103, a RAM 104, an operation unit 105, a display unit 106, a communication unit 107, an internal storage device 108 and a auxiliary storage device 109 via a bus 102. The CPU 101 controls the hardware according to a control program stored in the ROM 103. The RAM 104 is constituted of a SRAM, a flash memory or the like and receives data to be generated in execution of a control program stored in the ROM 103 and various kinds of data from an external network which is received via the communication unit 107.

The operation unit 105 is an input device such as a keyboard or a mouse, and the display unit 106 is a display device such as a CRT or a liquid crystal display device. The operation unit 105 and the display unit 106 are used for inputting and displaying data to be transmitted, for example. The communication unit 107 comprises a network termination unit such as a modem and controls transmission and receipt of various kinds of data to be transmitted to or received from the external network.

The auxiliary storage device 109 is constituted of an FD drive, a CD-ROM drive or the like for reading a computer program or the like from a record medium M such as an FD or a CD-ROM for recording a computer program or the like of the present invention, and the read computer program is stored in the internal storage device 108. The computer program stored in the internal storage device 108 is read into the RAM 104 and executed arbitrarily according to an indication from the CPU 101. By executing a computer program of the present invention by the CPU 101, the information processing apparatus 100 functions as an apparatus for detecting a malicious code from data received at the communication unit 107.

The computer program described above is preferably a resident program to be read automatically to the RAM 104 when the information processing apparatus 100 is activated, so that a malicious code is detected automatically when data from outside is received at the communication unit 107. It should be noted that the detection procedure of a malicious code is the same as the one explained in the First Embodiment and explanation thereof will be omitted.

It should be noted that, although a computer program of the present invention has been explained as a form to be provided by the record medium M, the computer program may be provided by communication means via the communication unit 107.

Moreover, although the present embodiment is constructed to detect a malicious code using the information processing apparatus 100 such as a personal computer, it should be understood that the present invention can be applied to a mobile telephone, a PDA, a computer game machine, an in-car communication device and various kinds of home information appliances in addition to a personal computer.

Moreover, the present invention can be also provided as an application software package for detecting computer virus, by providing a computer program of the present invention which is recorded in a record medium such as an FD or a CD-ROM.

INDUSTRIAL APPLICABILITY

According to the present invention, for reading data from storing means sequentially by one byte and determining whether an instruction code for executing a malicious process is included or not, a pattern of occurrence of instruction codes is detected for a plurality of data sequence having different read addresses. Accordingly, by focusing attention on the pattern which is uncommon in normal data for detection, it becomes possible to cope with occurrence of an unknown malicious code as long as the essential process content of the malicious code does not change. Moreover, although an occurrence pattern to be detected sometimes differs according to where is set as a detection starting position since detection in the present invention is performed based on an occurrence pattern of an instruction code, improper determination tends less to be made and the detection accuracy is enhanced by performing detection for a plurality of data sequences having sequentially different read addresses.

According to the present invention comprising a table for storing a correspondence of data of a first byte of an instruction code to a byte length of the instruction code, it is possible to inhibit detection of a malicious code when a read address of data is located at a byte other than the first byte of an instruction code in an instruction sequence and enhancement of the processing speed can be realized.

According to the present invention, since a pattern including a process of obtaining an address in storing means where a running instruction code group is located is detected, a detection technique which focuses attention on the essential structure of a malicious code can be suggested.

According to the present invention, a pattern which includes an instruction code for calling an instruction code group for executing a predetermined process and includes an instruction code for obtaining a return address of the instruction code in an instruction code group of a calling destination is detected. Accordingly, it is possible to easily determine whether data is one for executing a malicious process or not, and it becomes possible to cope with an unknown malicious code by performing detection on the basis of the essential structure thereof.

According to the present invention, a pattern having a branch destination of a branch instruction associated with the instruction code group mentioned above is detected. Accordingly, it is possible to easily determine whether data is one for executing a malicious process or not, and it is possible to cope with an unknown malicious code by performing detection based on the essential structure thereof.

According to the present invention, a pattern further including an instruction code for activating system call is detected. Accordingly, it is possible to detect a case where the probability of execution of a malicious code is increased, and therefore the detection accuracy is enhanced.

According to the present invention, a pattern including an instruction code for indicating rewriting of data starting from the return address is detected. Accordingly, it becomes possible to cope with even a malicious code from which it is unclear before execution that what type of process is to be executed.

According to the present invention, since it is determined whether a predetermined character code is included after an instruction code for calling the instruction code mentioned above or not, the detection accuracy in the detection process of a malicious code for a particular CPU can be enhanced.

According to the present invention, it is possible to easily determine whether data is one for executing a malicious process or not since it is determined that data is one for executing a malicious process when an emergence pattern of an instruction code to be detected is detected, and it becomes possible to cope with even an unknown malicious code since determination is made based on the essential structure thereof.

According to the present invention, when it is determined that a detected data series is data for executing a malicious process, the fact is announced to outside. Accordingly, it becomes possible to break communication or the like at the point of detection of a malicious code to prevent failure to be caused by the malicious code.

The invention claimed is:

1. A malicious-process-determining method for determining whether or not a malicious process is executed based on instruction codes included in received data, using a data processing apparatus comprising a receiving device for receiving data including a plurality of instruction codes having different byte lengths and a storage device for storing received data, the method comprising the steps of:

reading data stored in the storage device sequentially one byte by one byte; and utilizing a processor to analyze each read data byte, in sequence, in order to:

detect whether a pattern of occurrence of instruction codes is contained in a data sequence composed of a contiguous sequence of byte strings terminating at the read data byte, and if a pattern of occurrence of instruction codes is detected in a data sequence terminating at the read data byte, determine whether a process, which is to be executed in the data sequence terminating at the read data byte, is a malicious process or not based on the detected pattern of occurrence of instruction codes, wherein the analysis of each read data byte is performed in such a manner as not to require re-reading any data byte that was previously read from the storage device and analyzed.

2. A data processing apparatus comprising a receiving device for receiving data including a plurality of instruction codes having different byte lengths, and a storage device for storing received data, and a processor for determining whether or not a process to be executed is a malicious process based on the instruction codes included in stored data, the processor being programmed to:

read data stored in the storage device sequentially one byte by one byte; and analyze each read data byte, in sequence, in order to:

detect whether a pattern of occurrence of instruction codes is contained in a data sequence composed of a contiguous sequence of byte strings terminating at the read data byte, and if a pattern of occurrence of instruction codes is detected in a data sequence terminating at the read data byte, whether a process, which is to be executed in the data sequence terminating at the read data byte, is a malicious process or not based on the detected pattern of occurrence of instruction codes, wherein the analysis of each read data byte is performed in such a manner as not to require re-reading any data byte that was previously read from the storage device and analyzed.

3. The data processing apparatus according to claim 2, further comprising a memory in which is stored a table storing the relationship between data of a first byte of the instruction code and a byte length of the instruction code.

4. The data processing apparatus according to claim 2, wherein a pattern to be detected by the analysis of each read data byte includes a process for obtaining an address of the storage device where an executing instruction code group is located.

5. The data processing apparatus according to claim 2, wherein a pattern to be detected by the analysis of each read data byte includes an instruction code for calling an instruction code group for executing a predetermined process, and the instruction code group includes an instruction code for obtaining a return address.

6. The data processing apparatus according to claim 5, wherein the pattern includes an instruction code that is related to a branch instruction, and an branch address of the instruction code is associated with an instruction code for calling the instruction code group.

7. The data processing apparatus according to claim 5, wherein the pattern further includes an instruction code for activating a system call.

8. The data processing apparatus according to claim 5, wherein the pattern further includes an instruction code for indicating rewriting of data starting from the return address.

9. The data processing apparatus according to claim 5, wherein the pattern further includes a predetermined character code after the instruction code.

10. The data processing apparatus according to claim 2, wherein the data sequence is detected to be data for executing a malicious process when a pattern is detected by the analysis.

11. The data processing apparatus according to claim 2, wherein the processor is further programmed to notify information to the outside when the data sequence is detected to be data for executing a malicious process.

12. A data processing apparatus comprising:

a receiving section for receiving data including a plurality of instruction codes having different byte lengths;

a memory for storing received data; and a controller configured to perform operations of:

reading data stored in the memory sequentially one byte by one byte;

analyze each read data byte, in sequence, in order to:

detect whether a pattern of occurrence of instruction codes is contained in a data sequence composed of a contiguous sequence of byte strings terminating at the read data byte, and if a pattern of occurrence of instruction codes is detected in a data sequence terminating at the read data byte, determine whether a process, which is to be executed in the data sequence terminating at the read data byte, is a malicious process or not based on the detected pattern of occurrence of instruction codes, wherein the analysis of each read data byte is performed in such a manner as not to require re-reading any data byte that was previously read from the storage device and analyzed.

13. The data processing apparatus according to claim 12, wherein a pattern to be detected by the controller includes a process for obtaining an address of the memory where an executing instruction code group is located.

14. The data processing apparatus according to claim 12, wherein a pattern to be detected by the controller includes an instruction code for calling an instruction code group for executing a predetermined process, and the instruction code group includes an instruction code for obtaining a return address.

15. A computer-readable recording medium on which is recorded a computer program which, when executed, causes a computer to determine whether or not a malicious process is executed based on data including a plurality of instruction codes having different byte lengths, the computer program causing the computer to perform the steps of:

reading data stored in a memory sequentially one byte by one byte; and analyzing each read data byte, in sequence, in order to:
  detect a pattern of occurrence of instruction codes that are contained in each of data sequences, which are respectively composed of a contiguous sequence of byte strings and have a first byte corresponding to a different read address, and
  if a pattern of occurrence of instruction codes is detected in a data sequence terminating at the read data byte, determine whether a process, which is to be executed in the data sequence terminating at the read data byte, is a malicious process or not based on the detected pattern of occurrence of instruction codes,
wherein the analysis of each read data byte is performed in such a manner as not to require re-reading any data byte that was previously read from the storage device and analyzed.

* * * * *